United States Patent
You et al.

(10) Patent No.: US 10,405,266 B2
(45) Date of Patent: Sep. 3, 2019

(54) METHOD AND USER EQUIPMENT FOR RECEIVING DOWNLINK CONTROL CHANNEL, AND METHOD AND BASE STATION FOR TRANSMITTING DOWNLINK CONTROL CHANNEL

(71) Applicant: LG ELECTRONICS INC., Seoul (KR)

(72) Inventors: Hyangsun You, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 298 days.

(21) Appl. No.: 15/470,641

(22) Filed: Mar. 27, 2017

(65) Prior Publication Data

US 2017/0289899 A1    Oct. 5, 2017

Related U.S. Application Data

(60) Provisional application No. 62/317,649, filed on Apr. 4, 2016.

(51) Int. Cl.
| | | |
|---|---|---|
| *H04W 4/00* | (2018.01) | |
| *H04W 48/12* | (2009.01) | |
| *H04L 5/00* | (2006.01) | |
| *H04W 88/08* | (2009.01) | |
| *H04W 72/04* | (2009.01) | |

(52) U.S. Cl.
CPC ............ *H04W 48/12* (2013.01); *H04L 5/0007* (2013.01); *H04L 5/0044* (2013.01); *H04W 88/08* (2013.01); *H04W 72/042* (2013.01)

(58) Field of Classification Search
CPC .................................................... H04W 48/12
See application file for complete search history.

(56) References Cited

U.S. PATENT DOCUMENTS

| | | | | |
|---|---|---|---|---|
| 8,995,376 B2* | 3/2015 | Pan | ......................... | H04L 5/001 |
| | | | | 370/329 |
| 2013/0286960 A1* | 10/2013 | Li | ....................... | H04W 72/042 |
| | | | | 370/329 |
| 2014/0192734 A1* | 7/2014 | Ng | ........................ | H04L 5/0035 |
| | | | | 370/329 |
| 2015/0181576 A1* | 6/2015 | Papasakellariou | .... | H04L 5/0053 |
| | | | | 370/329 |
| 2015/0245323 A1* | 8/2015 | You | ..................... | H04W 72/042 |
| | | | | 370/329 |
| 2017/0289829 A1* | 10/2017 | Rico Alvarino | ..... | H04B 7/0626 |
| 2018/0049164 A1* | 2/2018 | Wu | ...................... | H04W 72/042 |
| 2018/0287742 A1* | 10/2018 | Feng | ..................... | H04L 1/1812 |
| 2018/0324768 A1* | 11/2018 | Shaheen | ........... | H04W 72/0446 |
| 2019/0097779 A1* | 3/2019 | Wu | ........................... | H04L 5/00 |

* cited by examiner

*Primary Examiner* — Guang W Li
(74) *Attorney, Agent, or Firm* — Lee Hong Degerman Kang Waimey

(57) ABSTRACT

Information indicating one of possible PDSCH start subframes may be provided to the UE via the PDCCH. The PDSCH corresponding to the PDCCH may be transmitted/received starting from the indicated subframe. The possible PDSCH start subframes may be determined based on the ratio of the maximum number of PDCCH repetitions in the PDCCH search space and may be determined based on the ratio of the number of times related to the PDSCH repetition after the PDCCH search space.

6 Claims, 11 Drawing Sheets

- [p] RE occupied by CRS of port p ( p∈0, p∈0,1 or p∈0,1,2,3 )
- RE occupied by UE-RS of port(s) p ( p∈7, p∈8, p∈7,8 or p∈7,8,11,13 )
- RE occupied by UE-RS of port(s) p ( p∈9, p∈10, p∈9,10 or p∈9,10,12,14 )

METHOD AND USER EQUIPMENT FOR RECEIVING DOWNLINK CONTROL CHANNEL, AND METHOD AND BASE STATION FOR TRANSMITTING DOWNLINK CONTROL CHANNEL

CROSS-REFERENCE TO RELATED APPLICATIONS

Pursuant to 35 U.S.C. § 119(e), this application claims the benefit of U.S. Provisional Patent Application No. 62/317,649, filed on Apr. 4, 2016, the contents of which are hereby incorporated by reference herein in its entirety.

TECHNICAL FIELD

The present invention relates to a wireless communication system, and more particularly, to a method and apparatus for transmitting/receiving a downlink channel.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

Also, with development of smart devices, a new scheme for efficiently transmitting/receiving a small amount of data or efficiently transmitting/receiving data occurring at a low frequency is required.

The technical objects that can be achieved through the present invention are not limited to what has been particularly described hereinabove and other technical objects not described herein will be more clearly understood by persons skilled in the art from the following detailed description.

SUMMARY

Information indicating one of possible PDSCH start subframes may be provided to a UE over the PDCCH. The PDSCH corresponding to the PDCCH may be transmitted/received starting from the indicated subframe. Within the PDCCH search space, the possible PDSCH start subframes may be determined based on the ratio of the maximum number of PDCCH repetitions. After the PDCCH search space, the possible PDSCH start subframes may be determined based on the ratio of the number of times related to repetition of the PDSCH.

In one aspect of the present invention, there is provided a method of receiving a downlink channel by a user equipment. The method may include receiving a physical downlink control channel (PDCCH) carrying downlink control information (DCI) in a PDCCH search space R times, wherein R is a positive integer, and receiving a physical downlink shared channel (PDSCH) starting from subframe l after subframe n, in which the PDCCH is received last, based on the DCI. The DCI may include information indicating the subframe l among possible PDSCH start positions. The possible PDSCH start positions may be determined based on a ratio of a maximum number of PDCCH repetitions $R_{max}$ in the PDCCH search space and may be determined based on a ratio of the number of times D related to repetition of the PDSCH after the PDCCH search space.

In another aspect of the present invention, there is provided a user equipment for receiving a downlink channel. The user equipment may include a radio frequency (RF) unit and a processor configured to control the RF unit. The processor may be configured to control the RF unit to receive a physical downlink control channel (PDCCH) carrying downlink control information (DCI) in a PDCCH search space R times, wherein R is a positive integer, and to control the RF unit to receive a physical downlink shared channel (PDSCH) starting from subframe l after subframe n, in which the PDCCH is received last, based on the DCI. The DCI may include information indicating the subframe l among possible PDSCH start positions. The possible PDSCH start positions may be determined based on a ratio of a maximum number of PDCCH repetitions $R_{max}$ in the PDCCH search space and may be determined based on a ratio of the number of times D related to repetition of the PDSCH after the PDCCH search space.

In another aspect of the present invention, there is provided a method of transmitting a downlink channel by a base station. The method may include transmitting a physical downlink control channel (PDCCH) carrying downlink control information (DCI) in a PDCCH search space R times, wherein R is a positive integer, and transmitting a physical downlink shared channel (PDSCH) starting from subframe l after subframe n, in which the PDCCH is transmitted last, based on the DCI. The DCI may include information indicating the subframe l among possible PDSCH start positions. The possible PDSCH start positions may be determined based on a ratio of a maximum number of PDCCH repetitions $R_{max}$ in the PDCCH search space and may be determined based on a ratio of the number of times D related to repetition of the PDSCH after the PDCCH search space.

In another aspect of the present invention, there is provided a base station for transmitting a downlink channel. The base station may include a radio frequency (RF) unit, and a processor configured to control the RF unit. The processor may be configured to control the RF unit to transmit a physical downlink control channel (PDCCH) carrying downlink control information (DCI) in a PDCCH search space R times, wherein R is a positive integer, and to control the RF unit to transmit a physical downlink shared channel (PDSCH) starting from subframe l after subframe n, in which the PDCCH is transmitted last, based on the DCI. The DCI may include information indicating the subframe l among possible PDSCH start positions. The possible PDSCH start positions may be determined based on a ratio of a maximum number of PDCCH repetitions $R_{max}$ in the PDCCH search space and may be determined based on a ratio of the number of times D related to repetition of the PDSCH after the PDCCH search space.

In each aspect of the present invention, the information indicating the subframe l in the DCI may indicate the number m of subframes from the subframe n to the subframe l.

In each aspect of the present invention, the subframe n may be subframe $k_0+k$, the subframe $k_0+k$ being a k-th subframe from start subframe $k_0$ of the PDCCH search space. Herein, k may be a multiple of ($R_{max}/8$).

In each aspect of the present invention, m may be given by the following table:

In each aspect of the present invention, D may be the number of repetitions of the PDSCH, a minimum repetition number ($=D_{min}$) of the PDSCH, which is configurable by the DCI, a maximum repetition number of the PDSCH, which is configurable by the DCI, $D_{min}*N$, or $D_{max}/N$. Herein, N is a positive integer.

According to the present invention, uplink/downlink signals can be efficiently transmitted/received. Therefore, overall throughput of a radio communication system can be improved.

According to one embodiment of the present invention, a low cost/complexity UE can perform communication with a BS at low cost while maintaining compatibility with a legacy system.

According to one embodiment of the present invention, the UE can be implemented at low cost/complexity.

According to one embodiment of the present invention, the UE and the BS can perform communication with each other at a narrowband.

According to an embodiment of the present invention, a small amount of data may be efficiently transmitted/received.

BRIEF DESCRIPTION OF THE DRAWING

The accompanying drawings, which are included to provide a further understanding of the invention, illustrate embodiments of the invention and together with the description serve to explain the principle of the invention.

| | | | | DCI field value for PDSCH start subframe | | | | |
|---|---|---|---|---|---|---|---|---|
| | 0 | 1 | 2 | 3 | 4 | 5 | 6 | 7 |
| m | 4 | $4 + R_{max}/8$ | $4 + (R_{max}/8) * 2$ | $4 + (R_{max}/8) * 3$ | $4 + (R_{max}/8) * 3 + D$ | $4 + (R_{max}/8) * 3 + D * 2$ | $4 + (R_{max}/8) * 3 + D * 3$ | $4 + (R_{max}/8) * 3 + D * 4$. |

Figure 4:
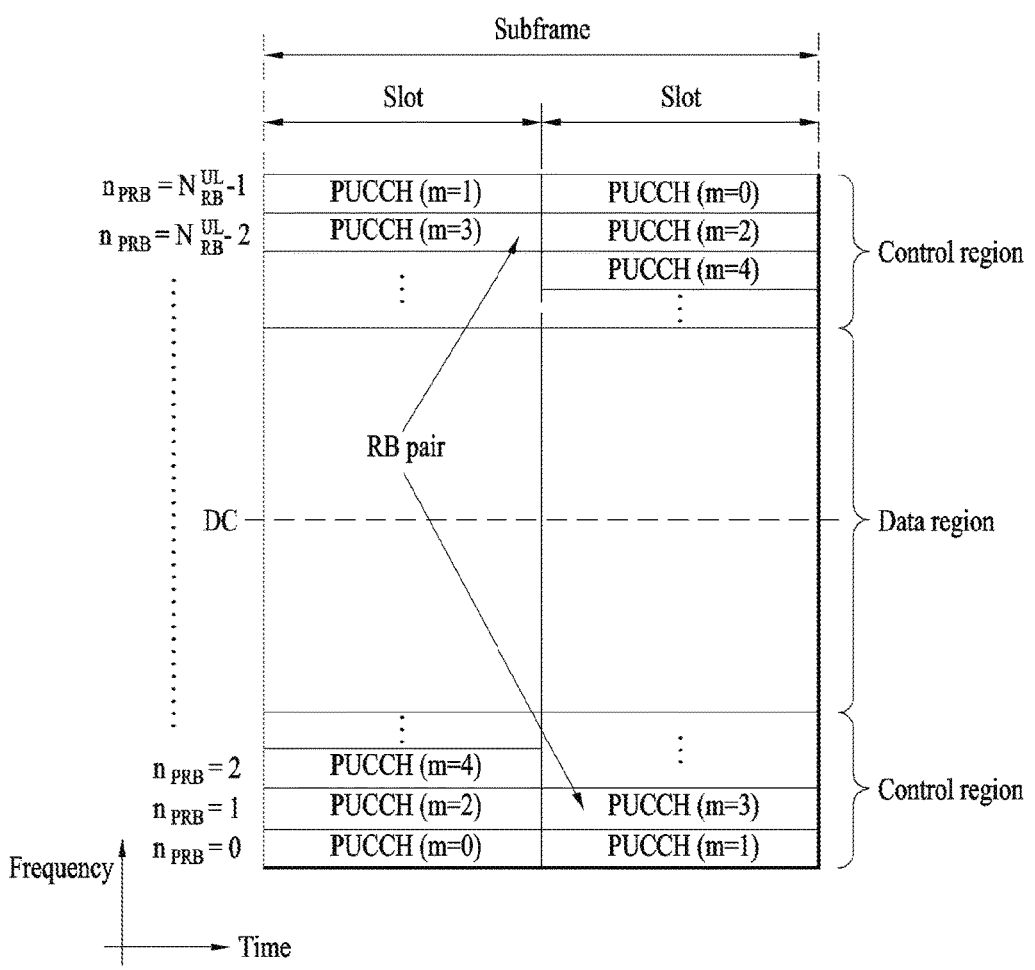

In each aspect of the present invention, m may be given by the following table:

FIG. 4 illustrates the structure of a UL subframe used in a wireless communication system.

| | | | | | DCI field value for PDSCH start subframe | | | |
|---|---|---|---|---|---|---|---|---|
| M | | 0 | 1 | 2 | 3 | 4 | 5 | 6 | 7 |
| k | $R_{max}/8$ | 4 | $4 + R_{max}/8$ | $4 + (R_{max}/8) * 2$ | $4 + (R_{max}/8) * 3$ | $4 + (R_{max}/8) * 4$ | $4 + (R_{max}/8) * 5$ | $4 + (R_{max}/8) * 6$ | $4 + (R_{max}/8) * 7$ |
| | $(R_{max}/8) * 2$ | 4 | $4 + R_{max}/8$ | $4 + (R_{max}/8) * 2$ | $4 + (R_{max}/8) * 3$ | $4 + (R_{max}/8) * 4$ | $4 + (R_{max}/8) * 5$ | $4 + (R_{max}/8) * 6$ | $4 + (R_{max}/8) * 6 + D$ |
| | $(R_{max}/8) * 3$ | 4 | $4 + R_{max}/8$ | $4 + (R_{max}/8) * 2$ | $4 + (R_{max}/8) * 3$ | $4 + (R_{max}/8) * 4$ | $4 + (R_{max}/8) * 5$ | $4 + (R_{max}/8) * 5 + D$ | $4 + (R_{max}/8) * 5 + D * 2$ |
| | $(R_{max}/8) * 4$ | 4 | $4 + R_{max}/8$ | $4 + (R_{max}/8) * 2$ | $4 + (R_{max}/8) * 3$ | $4 + (R_{max}/8) * 4$ | $4 + (R_{max}/8) * 4 + D$ | $4 + (R_{max}/8) * 4 + D * 2$ | $4 + (R_{max}/8) * 4 + D * 3$ |
| | $(R_{max}/8) * 5$ | 4 | $4 + R_{max}/8$ | $4 + (R_{max}/8) * 2$ | $4 + (R_{max}/8) * 3$ | $4 + (R_{max}/8) * 3 + D$ | $4 + (R_{max}/8) * 3 + D * 2$ | $4 + (R_{max}/8) * 3 + D * 3$ | $4 + (R_{max}/8) * 3 + D * 4$ |
| | $(R_{max}/8) * 6$ | 4 | $4 + R_{max}/8$ | $4 + (R_{max}/8) * 2$ | $4 + (R_{max}/8) * 2 + D$ | $4 + (R_{max}/8) * 2 + D * 2$ | $4 + (R_{max}/8) * 2 + D * 3$ | $4 + (R_{max}/8) * 2 + D * 4$ | $4 + (R_{max}/8) * 2 + D * 5$ |
| | $(R_{max}/8) * 7$ | 4 | $4 + R_{max}/8$ | $4 + (R_{max}/8) + D$ | $4 + (R_{max}/8) + D * 2$ | $4 + (R_{max}/8) + D * 3$ | $4 + (R_{max}/8) + D * 4$ | $4 + R_{max}/8 + D * 5$ | $4 + R_{max}/8 + D * 6$ |
| | $(R_{max}/8) * 8$ | 4 | $4 + D$ | $4 + D * 2$ | $4 + D * 3$ | $4 + D * 4$ | $4 + D * 5$ | $4 + D * 6$ | $4 + D * 7$. |

Figure 5:
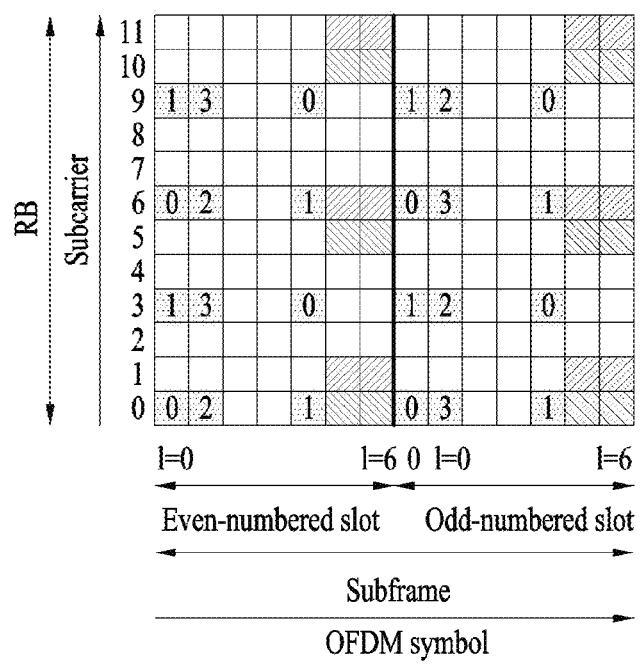

FIG. 5 illustrates configuration of cell specific reference signals (CRSs) and user specific reference signals (UE-RS).

Figure 6:
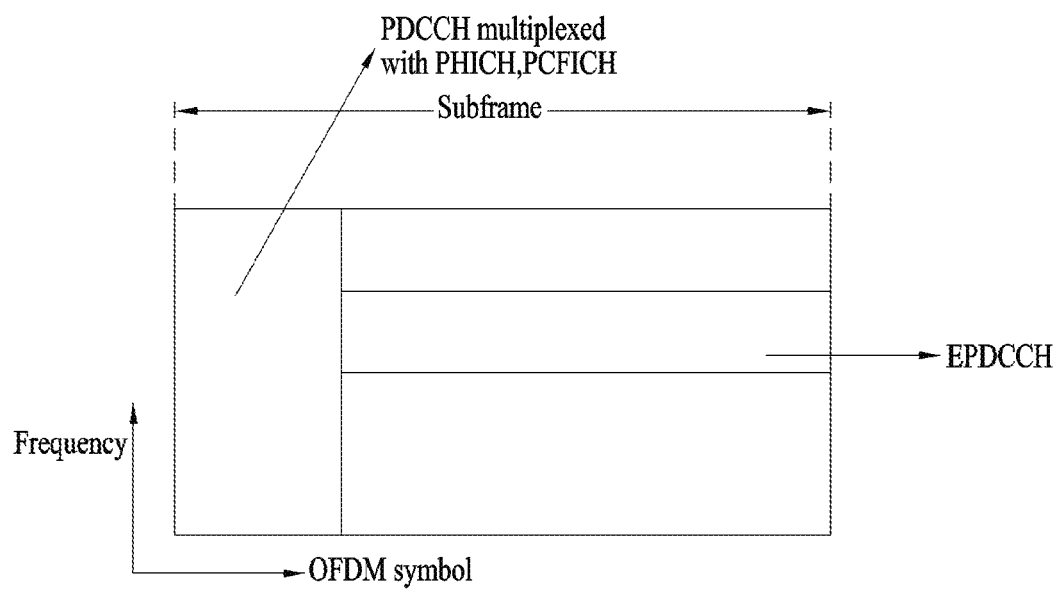

FIG. 6 is an example of a downlink control channel configured in a data region of a DL subframe.

Figure 7:
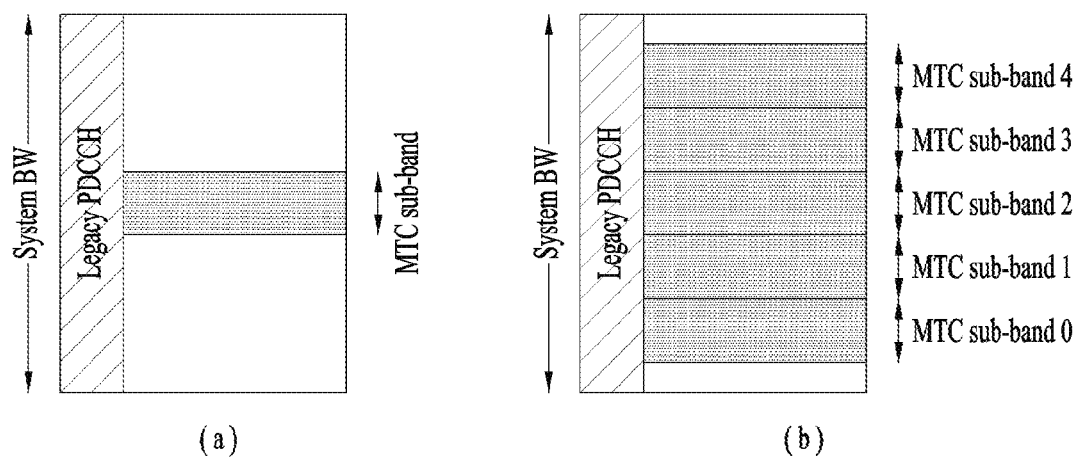

FIG. 7 illustrates an exemplary signal band for MTC.

Figure 8:
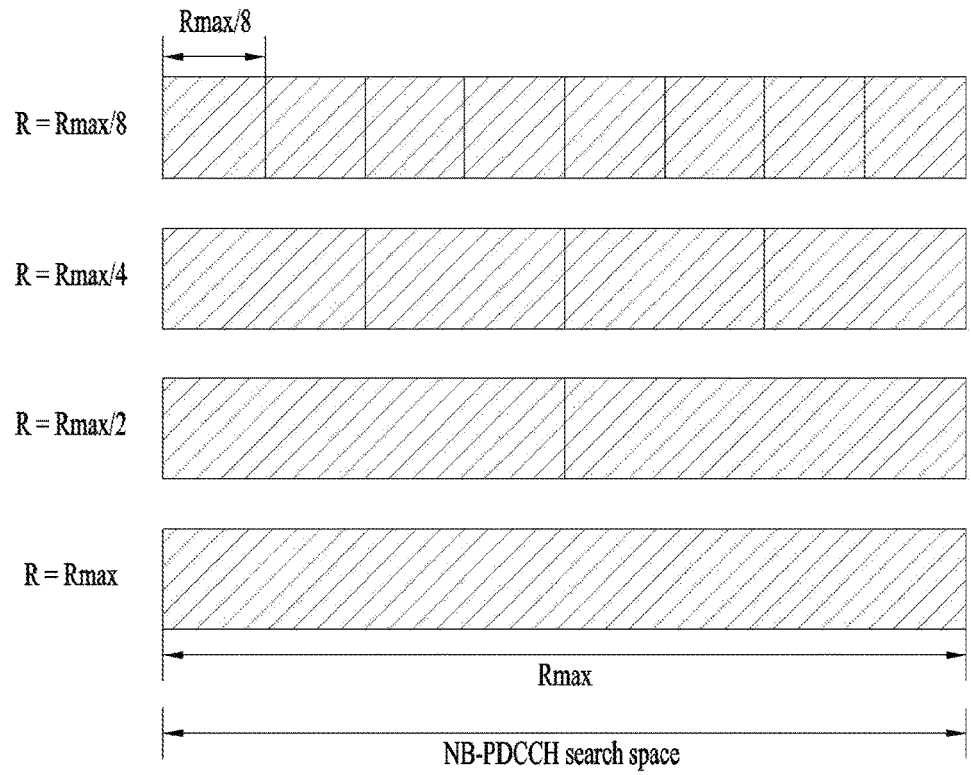
Figure 9:
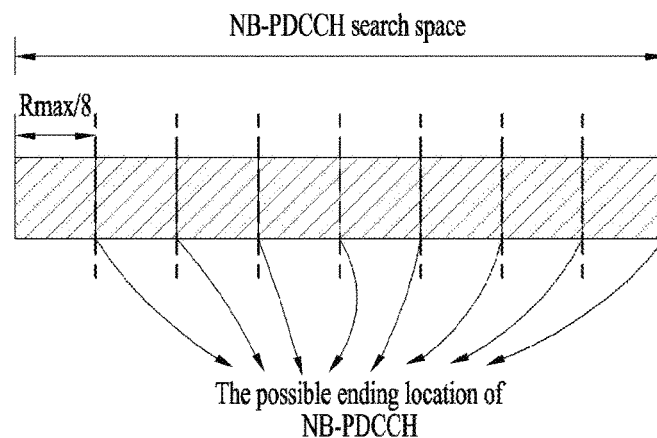

FIG. 8 and FIG. 9 show a position where transmission of a control channel may start and a position where the control channel may end according to the number of repetitions R of the control channel.

Figure 10:
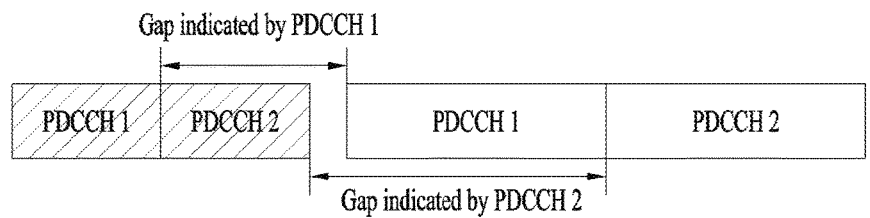

FIG. 10 illustrates a transmission timing relationship between PDCCH and PDSCH according to cross-subframe scheduling.

Figure 11:
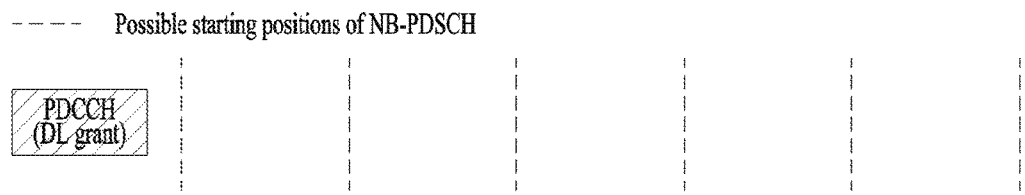

FIG. 11 shows transmission start positions of the PDSCH according to an embodiment of the present invention.

Figure 12:
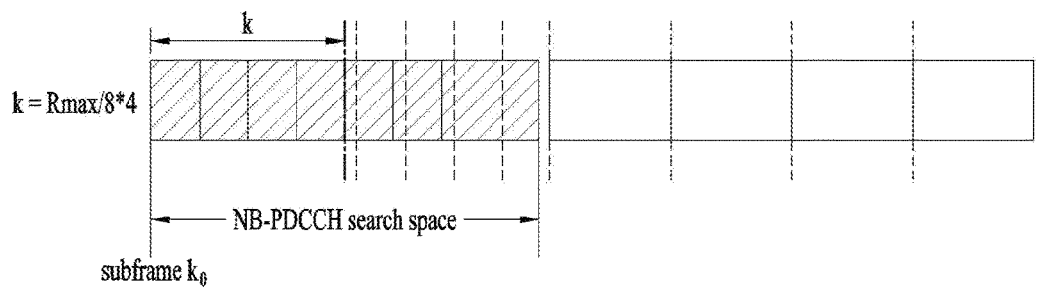

FIG. 12 shows transmission start positions of the PDSCH according to another embodiment of the present invention.

Figure 13:
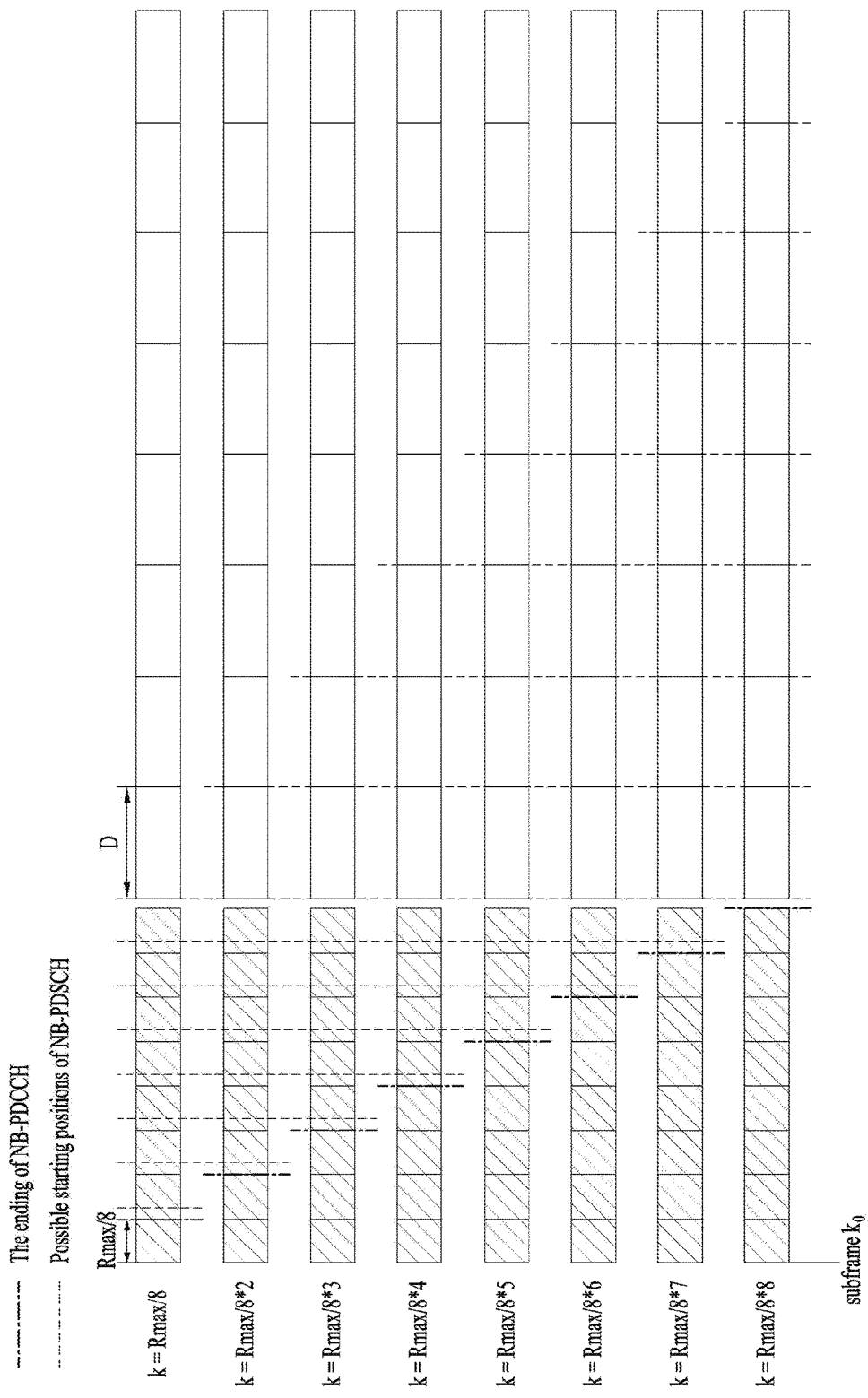

FIG. 13 shows transmission start positions of the PDSCH according to another embodiment of the present invention.

Figure 14:
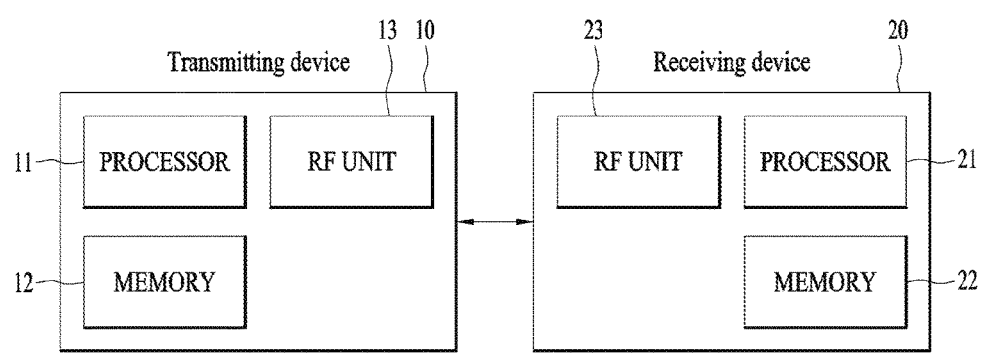

FIG. 14 is a block diagram illustrating elements of a transmitting device 10 and a receiving device 20 for implementing the present invention.

DETAILED DESCRIPTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that may be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA may be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to positions thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB may be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node may provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource may reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (HACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For the terms and techniques which are used herein but not specifically described, the 3GPP LTE/LTE-A standard documents, for example, 3GPP TS 36.211, 3GPP TS 36.212, 3GPP TS 36.213, 3GPP TS 36.321 and 3GPP TS 36.331, and the like may be referenced.

Figure 1:
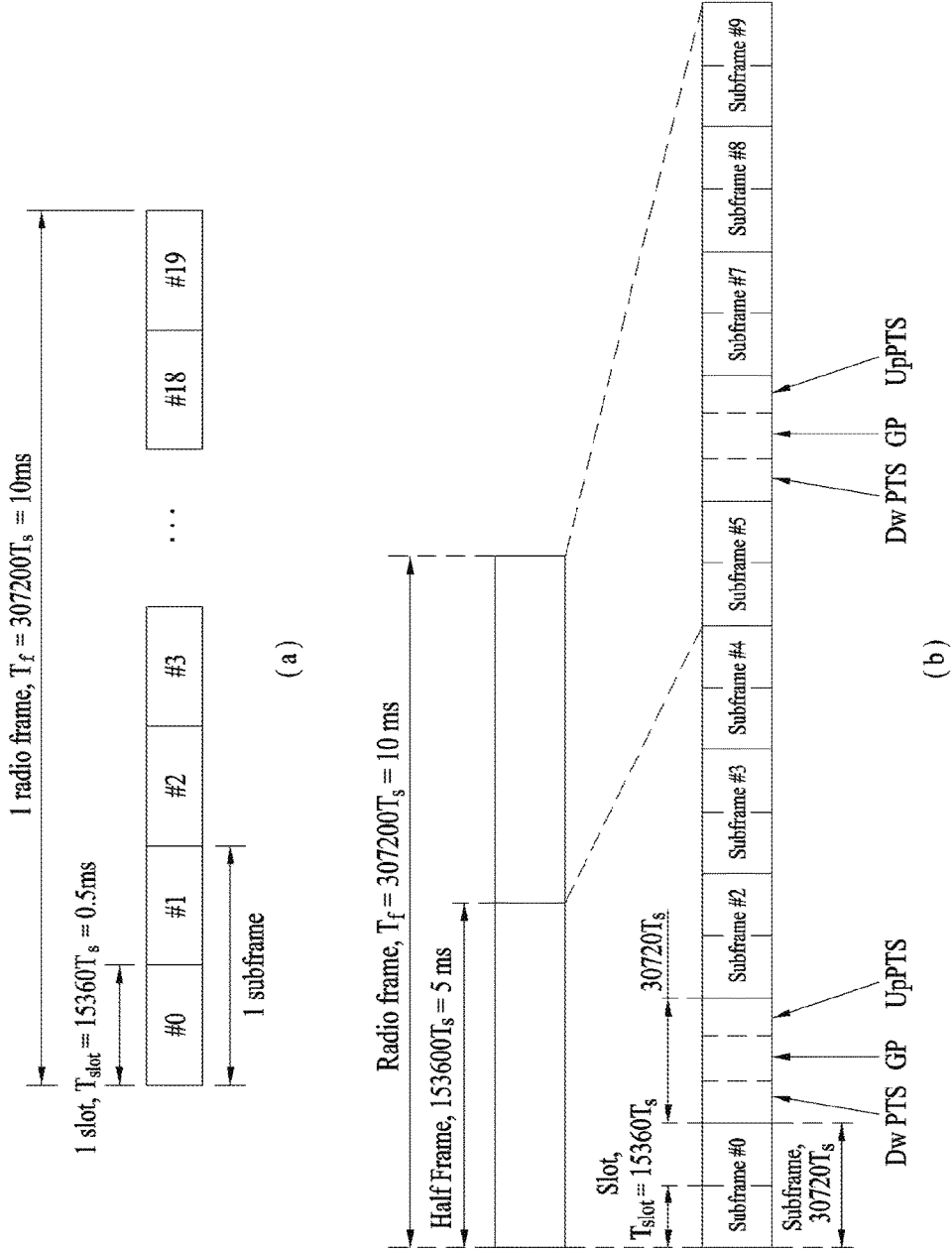
FIG. 1 illustrates the structure of a radio frame used in a wireless communication system.

FIG. 1 illustrates the structure of a radio frame used in a wireless communication system.

Specifically, FIG. 1(a) illustrates an exemplary structure of a radio frame which may be used in frequency division multiplexing (FDD) in 3GPP LTE/LTE-A and FIG. 1(b) illustrates an exemplary structure of a radio frame which may be used in time division multiplexing (TDD) in 3GPP LTE/LTE-A.

Referring to FIG. 1, a 3GPP LTE/LTE-A radio frame is 10 ms ($307{,}200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz$)$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, referring to FIGS. 1 and 3, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | | |

Figure 2:
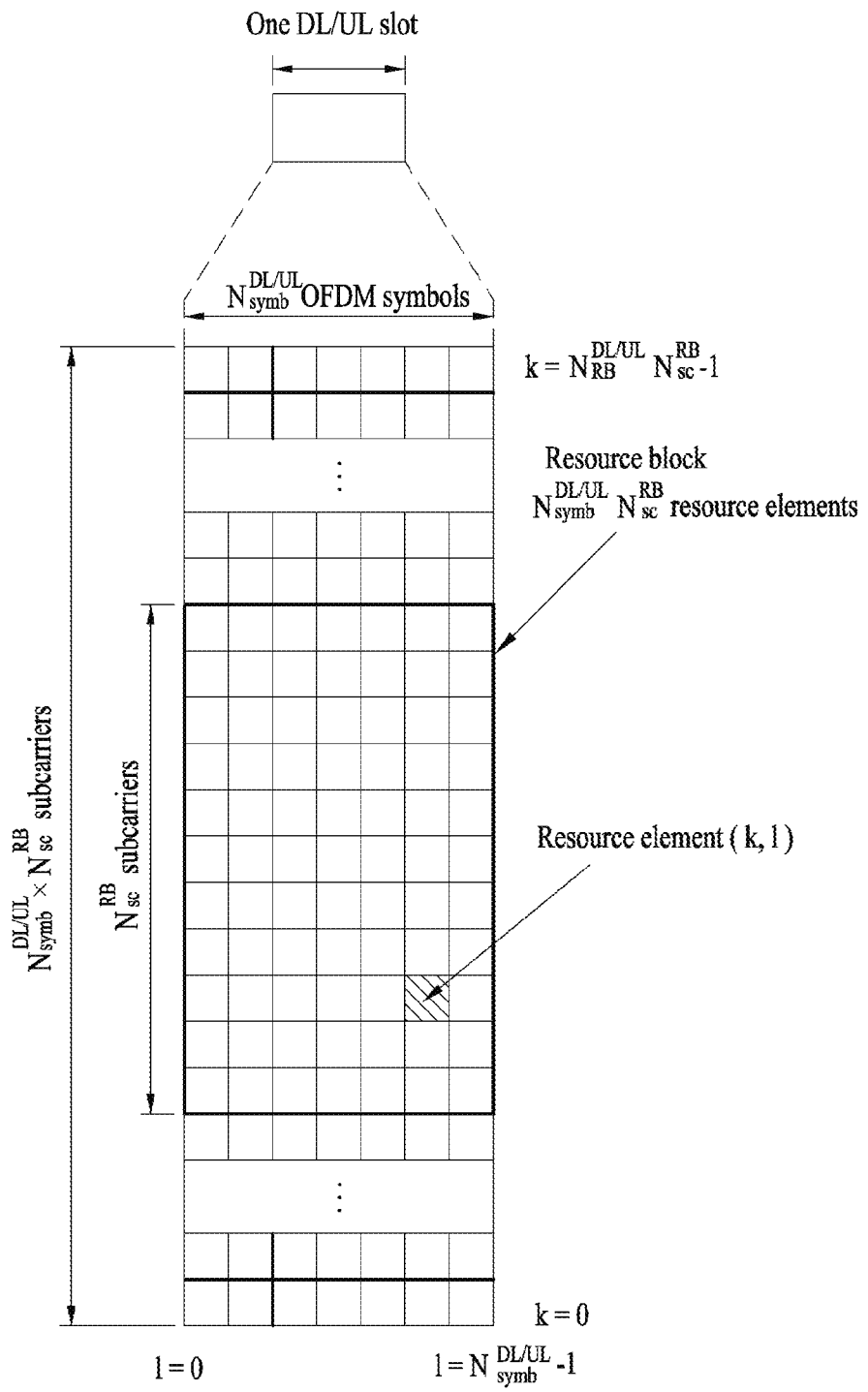
FIG. 2 illustrates the structure of a downlink (DL)/uplink (UL) slot in a wireless communication system.

FIG. 2 illustrates the structure of a DL/UL slot structure in a wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{DL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k,l) within one slot. k is an index ranging from 0 to $N^{DL/UL}_{RB} * N^{RB}_{sc} - 1$ in the frequency domain, and/is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
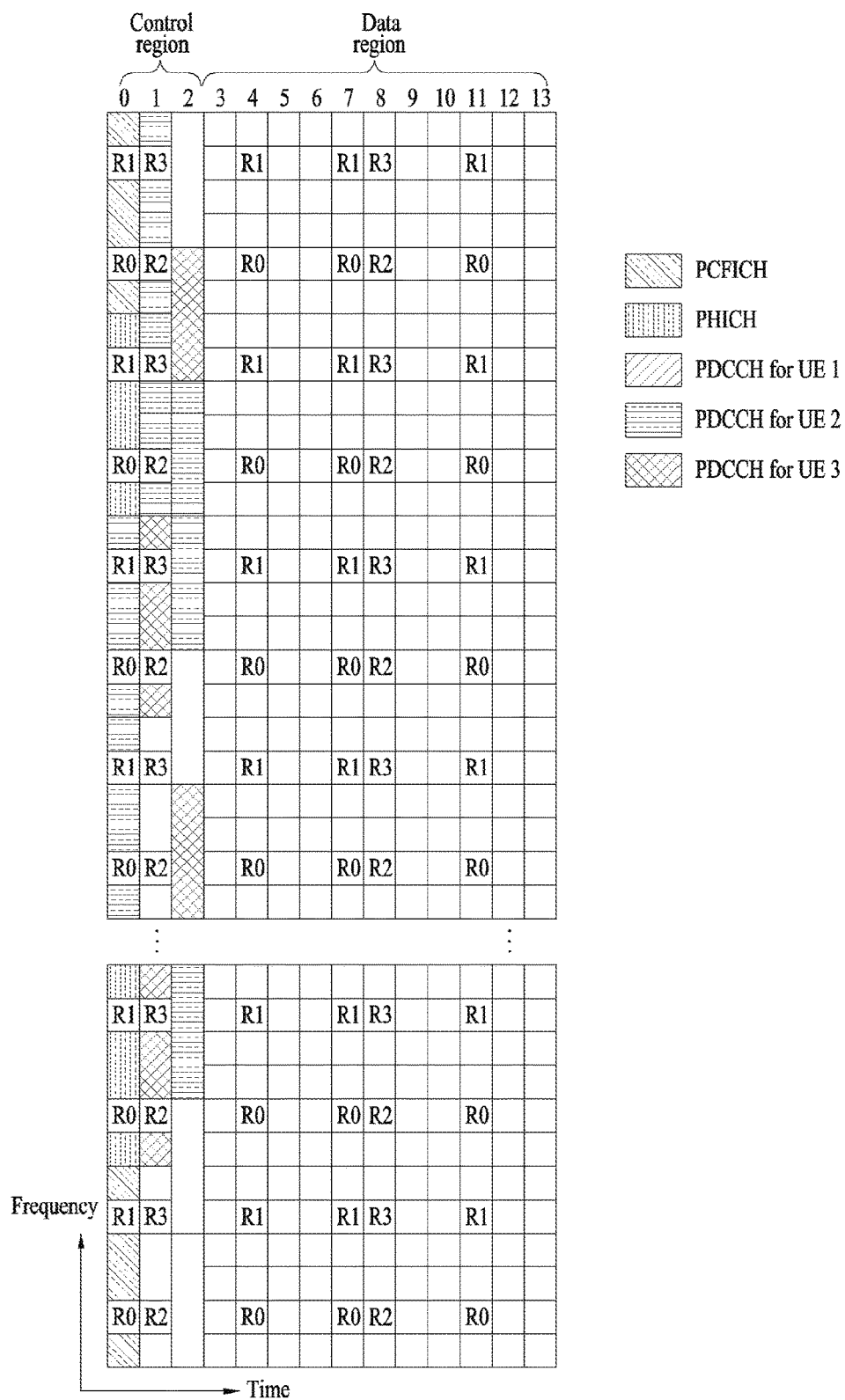
FIG. 3 illustrates the structure of a DL subframe used in a wireless communication system.

FIG. 3 illustrates the structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs. A set of OFDM symbols available for the PDCCH at a subframe is given by the following Table.

TABLE 3

| Subframe | Number of OFDM symbols for PDCCH when $N^{DL}_{RB} > 10$ | Number of OFDM symbols for PDCCH when $N^{DL}_{RB} \leq 10$ |
|---|---|---|
| Subframe 1 and 6 for frame structure type 2 | 1, 2 | 2 |
| MBSFN subframes on a carrier supporting PDCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A subset of downlink subframes within a radio frame on a carrier for supporting PDSCH transmission may be configured as MBSFN subframe(s) by a higher layer. Each MBSFN subframe is divided into a non-MBSFN region and an MBSFN region. The non-MBSFN region spans first one or two OFDM symbols, and its length is given by Table 3. The same CP as cyclic prefix (CP) used for subframe 0 is used for transmission within the non-MBSFN region of the MBSFN subframe. The MBSFN region within the MBSFN subframe is defined as OFDM symbols which are not used in the non-MBSFN region.

The PCFICH carries a control format indicator (CFI), which indicates any one of values of 1 to 3. For a downlink system bandwidth $1V^{DL}_{RB}>10$, the number 1, 2 or 3 of OFDM symbols which are spans of DCI carried by the PDCCH is given by the CFI. For a downlink system bandwidth $N^{DL}_{RB} \leq 10$, the number 2, 3 or 4 of OFDM symbols which are spans of DCI carried by the PDCCH is given by CFI+1. The CFI is coded in accordance with the following Table.

TABLE 4

| CFI | CFI code word $<b_0, b_1, ..., b_{31}>$ |
|---|---|
| 1 | <0,1,1,0,1,1,0,1,1,0,1,1,0,1,1,0,1,1,0,1,1,0,1,1,0,1,1,0,,1,0,1> |
| 2 | <1,0,1,1,0,1,1,0,1,1,0,1,1,0,1,1,0,1,1,0,1,1,0,1,1,0,1,1,0,1,1,0> |
| 3 | <1,1,0,1,1,0,1,1,0,1,1,0,1,1,0,1,1,0,1,1,0,1,1,0,1,1,0,1,1,0,1,1> |
| 4 (Reserved) | <0,0,0,0,0,0,0,0,0,0,0,0,0,0,0,0,0,0,0,0,0,0,0,0,0,0,0,0,0,0,0,0> |

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table shows examples of DCI formats.

TABLE 5

| DCI format | Description |
|---|---|
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

Other DCI formats in addition to the DCI formats defined in Table 5 may be defined.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode. Table 6 illustrates transmission modes for configuring multi-antenna technology and DCI formats for allowing a UE to perform blind decoding at the corresponding transmission mode. Particularly, Table 6 illustrates a relation between PDCCH and PDSCH configured by C-RNTI (Cell RNTI (Radio Network Temporary Identifier)).

TABLE 6

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7 |
|  | DCI format 2C | UE specific by C-RNTI | Up to 8 layer transmission, ports 7-14 or single-antenna port, port 7 or 8 |
| Mode 10 | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7 |
|  | DCI format 2D | UE specific by C-RNTI | Up to 8 layer transmission, ports 7-14 or single-antenna port, port 7 or 8 |

Although transmission modes 1 to 10 are listed in Table 6, other transmission modes in addition to the transmission modes defined in Table 6 may be defined.

Referring to Table 6, a UE configured to a transmission mode 9, for example, tries to decode PDCCH candidates of a UE-specific search space (USS) to a DCI format 1A, and tries to decode PDCCH candidates of a common search space (CSS) and the USS to a DCI format 2C. The UE may decode a PDSCH in accordance with DCI based on the DCI format successfully decoded. If DCI decoding from one of a plurality of PDCCH candidates to the DCI format 1A is successfully performed, the UE may decode the PDSCH by assuming that up to 8 layers from antenna ports 7 to 14 are transmitted thereto through the PDSCH, or may decode the PDSCH by assuming that a single layer from the antenna port 7 or 8 is transmitted thereto through the PDSCH.

For example, a transmission mode is semi-statically configured for the UE to allow the UE to receive a PDSCH which is transmitted according to one of a plurality of predefined transmission modes. The UE attempts to decode the PDCCH using only DCI formats corresponding to the transmission mode thereof. In other words, in order to maintain the computational load of the UE according to an attempt of blind decoding at a level lower than or equal to a certain level, not all DCI formats are simultaneously searched by the UE.

The PDCCH is allocated to first m number of OFDM symbol(s) within a subframe. In this case, m is an integer equal to or greater than 1, and is indicated by the PCFICH.

The PDCCH is transmitted on an aggregation of one or a plurality of continuous control channel elements (CCEs). The CCE is a logical allocation unit used to provide a coding rate based on the status of a radio channel to the PDCCH. The CCE corresponds to a plurality of resource element groups (REGs). For example, each CCE contains 9 REGs, which are distributed across the first 1/2/3 (/4 if needed for a 1.4 MHz channel) OFDM symbols and the system bandwidth through interleaving to enable diversity and to mitigate interference. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$. The control region of each serving cell consists of a set of CCEs, numbered from 0 to $N_{CCE,k}-1$, where $N_{CCE,k}$ is the total number of CCEs in the control region of subframe k. A PDCCH consisting of n consecutive CCEs may only start on a CCE fulfilling i mod n=0, where i is the CCE number.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH may be located for each UE is defined. A CCE set in which the UE may detect a PDCCH thereof is referred to as a PDCCH search space or simply as a search space (SS). An individual resource on which the PDCCH may be transmitted in the SS is called a PDCCH candidate. A set of PDCCH candidates that the UE is to monitor is defined in terms of SSs, where a search space $S^{(L)}_k$ at aggregation level $L \in \{1, 2, 4, 8\}$ is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs. The following table shows an example of aggregation levels for defining SS.

TABLE 7

| Type | Search space $S^{(L)}_k$ | | Number of PDCCH candidates $M^{(L)}$ |
| --- | --- | --- | --- |
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

For each serving cell on which PDCCH is monitored, the CCEs corresponding to PDCCH candidates m of the search space $S^{(L)}_k$ are configured by "$L*\{(Y_k+m') \bmod \text{floor}(N_{CCE,k}/L)\}+i$", where $i=0, \ldots, L-1$. For the common search space $m'=m$. For the PDCCH UE specific search space, for the serving cell on which PDCCH is monitored, if the monitoring UE is configured with carrier indicator field then $m'=m+M^{(L)}*n_{CI}$ where $n_{CI}$ is the carrier indicator field (CIF) value, else if the monitoring UE is not configured with carrier indicator field then $m'=m$, where $m=0, 1, \ldots, M^{(L)}-1$. $M^{(L)}$ is the number of PDCCH candidates to monitor at aggregation level L in the given search space. The carrier indication field value may be the same as a serving cell index (ServCellIndex). For the common search space, $Y_k$ is set to 0 for the two aggregation levels L=4 and L=8. For the UE-specific search space $S^{(L)}_k$ at aggregation level D, the variable $Y_k$ is defined by "$Y_k=(A \cdot Y_{k-1}) \bmod D$", where $Y_{-1}=n_{RNTI} \neq 0$, A=39827, D=65537 and $k=\text{floor}(n_s/2)$. $n_s$ is the slot number within a radio frame.

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the position at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency position) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE may receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that may be obtained by the UE generally when the eNB uses the PMI.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC).

For example, three 20 MHz CCs may be aggregated on each of a UL and a DL to support a bandwidth of 60 MHz. The respective CCs may be contiguous or non-contiguous in the frequency domain. For convenience, although it has been described that the bandwidth of UL CC and the bandwidth of DL CC are the same as each other and symmetric to each other, the bandwidth of each CC may be independently determined. Asymmetrical carrier aggregation in which the number of UL CCs is different from the number of DL CCs may be implemented. DL/UL CC limited to a specific UE may be referred to as a serving UL/DL CC configured for the specific UE.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is fully reconfigured will be referred to as Pcell, and a cell which may be activated/deactivated freely by the eNB will be referred to as Scell. The Pcell and the Scell may be discriminated from each other on the basis of the control information. For example, specific control information may be set to be transmitted and received through a specific cell only. This specific cell may be referred to as the Pcell, and the other cell(s) may be referred to as Scell(s).

A configured cell refers to a cell in which carrier aggregation is performed for a UE based on measurement report from another eNB or UE among cells of an eNB and is configured per UE. The cell configured for the UE may be a serving cell in terms of the UE. For the cell configured for the UE, i.e. the serving cell, resources for ACK/NACK transmission for PDSCH transmission are reserved in advance. An activated cell refers to a cell configured to be actually used for PDSCH/PUSCH transmission among cells configured for the UE and CSI reporting and SRS transmission for PDSCH/PUSCH transmission are performed in the activated cell. A deactivated cell refers to a cell configured not to be used for PDSCH/PUSCH transmission by the command of an eNB or the operation of a timer and, if a cell is deactivated, CSI reporting and SRS transmission are also stopped in the cell.

For reference, a carrier indicator (CI) denotes a serving cell index (ServCellIndex), CI=0 is applied to Pcell. The serving cell index is a short ID used to identify a serving cell. For example, any one of integers from 0 to 'maximum number of carrier frequencies which may be configured for the UE at a time-1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

In legacy systems subject to communication with one node, the UE-RS, CSI-RS, and CRS are transmitted at the same position, and therefore the UE does not consider a situation in which delay spread, Doppler spread, frequency shift, average received power, and received timing differ among the UE-RS port(s), CSI-RS port(s) and CRS port(s). However, for a communication system to which coordinated Multi-Point (CoMP) communication technology allowing more than one node to simultaneously participate in communication with the UE is applied, the properties may differ among the PDCCH port(s), PDSCH port(s), UE-RS port(s), CSI-RS port(s) and/or CRS port(s). For this reason, the concept of a "quasi co-located antenna port" is introduced for a mode (hereinafter, CoMP mode) in which multiple nodes may participate in communication.

With respect to antenna ports, the term "Quasi co-located (QCL)" or "quasi co-position (QCL)" may be defined as follows: if two antenna ports are QCL, the UE may assume that the large-scale properties of a signal received through one of the two antenna ports may be inferred from the signal received through the other antenna port. The large-scale properties include delay spread, Doppler spread, frequency shift, average received power and/or received timing.

With respect to channels, the term QCL may also be defined as follows: if two antenna ports are QCL, the UE may assume that the large-scale properties of a channel for conveying a symbol on one of the two antenna ports may be inferred from the large-scale properties of a channel for conveying a symbol on the other antenna port. The large-scale properties include delay spread, Doppler spread, Doppler shift, average gain and/or average delay.

One of the two definitions of QCL given above may be applied to the embodiments of the present invention. Alternatively, the definition of QCL may be modified to assume that antenna ports for which QCL assumption is established are co-located. For example, QCL may be defined in a manner that the UE assumes that the antenna ports for which QCL assumption is established are antenna ports of the same transmission point.

For non-quasi co-located (NQC) antenna ports, the UE cannot assume the same large-scale properties between the antenna ports. In this case, a typical UE needs to perform independent processing for each NQC antenna with respect to timing acquisition and tracking, frequency offset estimation and compensation, and delay estimation and Doppler estimation.

On the other hand, for antenna ports for which QCL assumption may be established, the UE performs the following operations:

Regarding Doppler spread, the UE may apply the results of estimation of the power-delay-profile, the delay spread and Doppler spectrum and the Doppler spread for one port to a filter (e.g., a Wiener filter) which is used for channel estimation for another port;

Regarding frequency shift and received timing, after performing time and frequency synchronization for one port, the UE may apply the same synchronization to demodulation on another port;

Further, regarding average received power, the UE may average measurements of reference signal received power (RSRP) over two or more antenna ports.

For example, if the UE receives a specific DMRS-based DL-related DCI format (e.g., DCI format 2C) over a PDCCH/EPDCCH, the UE performs data demodulation after performing channel estimation of the PDSCH through a configured DMRS sequence. If the UE may make an assumption that a DMRS port configuration received through the DL scheduling grant and a port for a specific RS (e.g., a specific CSI-RS, a specific CRS, a DL serving cell CRS of the UE, etc.) port are QCL, then the UE may apply the estimate(s) of the large-scale properties estimated through the specific RS port to channel estimation through the DMRS port, thereby improving processing performance of the DMRS-based receiver.

FIG. 5 illustrates configuration of cell specific reference signals (CRSs) and user specific reference signals (UE-RS). In particular, FIG. 5 shows REs occupied by the CRS(s) and UE-RS(s) on an RB pair of a subframe having a normal CP.

In an existing 3GPP system, since CRSs are used for both demodulation and measurement, the CRSs are transmitted in all DL subframes in a cell supporting PDSCH transmission and are transmitted through all antenna ports configured at an eNB.

Referring to FIG. 5, the CRS is transmitted through antenna ports p=0, p=0, 1, p=0, 1, 2, 3 in accordance with the number of antenna ports of a transmission mode. The CRS is fixed to a certain pattern within a subframe regardless of a control region and a data region. The control channel is allocated to a resource of the control region, to which the CRS is not allocated, and the data channel is also allocated to a resource of the data region, to which the CRS is not allocated.

A UE may measure CSI using the CRSs and demodulate a signal received on a PDSCH in a subframe including the CRSs. That is, the eNB transmits the CRSs at predetermined positions in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of DRS. Since the UE-RS and the CRS are used for demodulation, the UE-RS and the CRS may be regarded as demodulation RSs in terms of usage. Since the CSI-RS and the CRS are used for channel measurement or channel estimation, the CSI-RS and the CRS may be regarded as measurement RSs.

Referring to FIG. 5, UE-RSs are transmitted on antenna port(s) p=5, p=7, p=8 or p=7, 8, . . . , υ+6 for PDSCH transmission, where v is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may be lowered compared to that of the CRS.

In the 3GPP LTE-A system, the UE-RSs are defined in a PRB pair. Referring to FIG. 5, in a PRB having frequency-domain index $n_{PRB}$ assigned for PDSCH transmission with respect to p=7, p=8, or p=7, 8, . . . , υ+6, a part of UE-RS sequence r(m) is mapped to complex-valued modulation symbols $a^{(p)}_{k,l}$ in a subframe according to the following equation.

$$a_{k,l}^{(p)} = w_p(l') \cdot r(3 \cdot l' \cdot N_{RB}^{max,DL} + 3 \cdot n_{PRB} + m') \quad \text{Equation 1}$$

where $w_p(i)$, l', m' are given as follows.

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases} \quad \text{Equation 2}$$

$$k = 5m' + N_{SC}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with} \\ & \text{configuration 3, 4, 8 or 9 (see Table 2)} \\ l' \bmod 2 + 2 + 3\lfloor l'/2 \rfloor & \text{if in a special subframe with} \\ & \text{configuration 1, 2, 6 or 7 (see Table 2)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe} \\ & \text{with configuration 1, 2, 6 or 7 (see Table 2)} \\ 0, 1 & \text{if } n_s \bmod 2 = 0 \text{ and not in special subframe} \\ & \text{with configuration 1, 2, 6 or 7 (see Table 2)} \\ 2, 3 & \text{if } n_s \bmod 2 = 1 \text{ and not in special subframe} \\ & \text{with configuration 1, 2, 6 or 7 (see Table 2)} \end{cases}$$

$$m' = 0, 1, 2$$

where $n_s$ is the slot number within a radio frame and an integer among 0 to 19. The sequence $\overline{w}_p(i)$ for normal CP is given according to the following equation.

TABLE 8

| Antenna port p | $[\overline{w}_p(0) \; \overline{w}_p(1) \; \overline{w}_p(2) \; \overline{w}_p(3)]$ |
| --- | --- |
| 7  | [+1 +1 +1 +1] |
| 8  | [+1 −1 +1 −1] |
| 9  | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port p∈{7, 8, . . . , υ+6}, the UE-RS sequence r(m) is defined as follows.

$$r(m) = \frac{1}{\sqrt{2}}(1 - 2 \cdot c(2m)) + j\frac{1}{\sqrt{2}}(1 - 2 \cdot c(2m+1)), \quad \text{Equation 3}$$

$$m = \begin{cases} 0, 1, \ldots, 12 N_{RB}^{max,DL} - 1 & \text{normal cyclic prefix} \\ 0, 1, \ldots, 16 N_{RB}^{max,DL} - 1 & \text{extended cyclic prefix} \end{cases}$$

where c(i) is a pseudo-random sequence defined by a length-31 Gold sequence. The output sequence c(n) of length $M_{PN}$, where n=0, 1, . . . , $M_{PN}$−1, is defined by the following equation.

$$c(n) = (x_1(n + N_C) + x_2(n + N_C)) \bmod 2$$

$$x_1(n+31) = (x_1(n+3) + (n)) \bmod 2$$

$$x_2(n+31) = (x_2(n+3) + x_2(n+2) + x_2(n+1) + x_2(n)) \bmod 2 \quad \text{Equation 4}$$

where $N_C$=1600 and the first m-sequence is initialized with $x_1(0)$=1, $x_1(n)$=0, n=1, 2, . . . , 30. The initialization of the second m-sequence is denoted by $c_{init} = \sum_{j=0}^{30} x_2(i) \cdot 2^i$ with the value depending on the application of the sequence.

In Equation 3, the pseudo-random sequence generator for generating c(i) is initialized with $c_{init}$ at the start of each subframe according to the following equation.

$$c_{init} = (\lfloor n_s/2 \rfloor + 1) \cdot (2 n_{ID}^{(nSCID)} + 1) \cdot 2^{16} \pm n_{SCID} \quad \text{Equation 5}$$

where the quantities $n^{(i)}_{ID}$, i=0, 1, which is corresponding to $n^{(nSCID)}_{ID}$, are given by a physical layer cell identity $N^{cell}_{ID}$ if no value for a scrambling identity $n^{DMRS,i}_{ID}$ is provided by higher layers or if DCI format 1A, 2B or 2C is used for DCI format associated with the PDSCH transmission, and given by $n^{DMRS,i}_{ID}$ otherwise.

In Equation 5, the value of $n_{SCID}$ is zero unless specified otherwise. For a PDSCH transmission on antenna ports 7 or 8, $n_{SCID}$ is given by the DCI format 2B or 2C. DCI format 2B is a DCI format for resource assignment for a PDSCH using a maximum of two antenna ports having UE-RSs. DCI format 2C is a DCI format for resource assignment for a PDSCH using a maximum of 8 antenna ports having UE-RSs Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH)

FIG. 6 is a example of a downlink control channel configured in a data region of a DL subframe.

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port p∈{107, 108, 109, 110} as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

For each serving cell, higher layer signaling may configure a UE with one or two EPDCCH-PRB-sets for EPDCCH monitoring. The PRB-pairs corresponding to an EPDCCH-PRB-set are indicated by higher layers. Each EPDCCH-PRB-set consists of set of ECCEs numbered from 0 to $N_{ECCE,p,k}-1$, where $N_{ECCE,p,k}$ is the number of ECCEs in EPDCCH-PRB-set p of subframe k. Each EPDCCH-PRB-set may be configured for either localized EPDCCH transmission or distributed EPDCCH transmission.

The UE shall monitor a set of EPDCCH candidates on one or more activated serving cells as configured by higher layer signaling for control information.

The set of EPDCCH candidates to monitor are defined in terms of EPDCCH UE-specific search spaces. For each serving cell, the subframes in which the UE monitors EPDCCH UE-specific search spaces are configured by higher layers.

An EPDCCH UE-specific search space $ES^{(L)}_k$ at aggregation level $L \in \{1, 2, 4, 8, 16, 32\}$ is defined by a set of EPDCCH candidates.

For an EPDCCH-PRB-set p, the ECCEs corresponding to EPDCCH candidate m of the search space ES % are given by the following equation.

$$L\left\{\left(Y_{p,k} + \left\lfloor \frac{m \cdot N_{ECCE,p,k}}{L \cdot M^{(L)}_p} \right\rfloor + b \right) \bmod \lfloor N_{ECCE,p,k} / L \rfloor \right\} + i \qquad \text{Equation 6}$$

where $1=0, \ldots, L-1$. $b=n_{CI}$ if the UE is configured with a carrier indicator field for the serving cell on which EPDCCH is monitored, otherwise b=0. $n_{CI}$ is the carrier indicator field (CIF) value, which is the same as a serving cell index (ServCellIndex). $m=0, 1, \ldots M^{(L)}_p-1$, $M^{(L)}_p$ is the number of EPDCCH candidates to monitor at aggregation level L in EPDCCH-PRB-set p. The variable $Y_{p,k}$ is defined by $Y_{p,k}=(A_p \cdot Y_{p,k-1}) \bmod D'$, where $Y_{p,k-1}=n_{RNTI}\neq 0$, $A_0=39827$, $A_0=39829$, $D=65537$ and $k=\text{floor}(n_s/2)$. $n_s$ is the slot number within a radio frame.

A UE is not expected to monitor an EPDCCH candidate, if an ECCE corresponding to that EPDCCH candidate is mapped to a PRB pair that overlaps in frequency with a transmission of either PBCH or PSS/SSS in the same subframe.

An EPDCCH is transmitted using an aggregation of one or several consecutive enhanced control channel elements (ECCEs). Each ECCE consists of multiple enhanced resource element groups (EREGs). EREGs are used for defining the mapping of enhanced control channels to resource elements. There are 16 EREGs, numbered from 0 to 15, per physical resource block (PRB) pair. Number all resource elements (REs), except resource elements carrying DMRS (hereinafter, EPDCCH DMRS) for demodulation of the EPDCCH, in a physical resource-block pair cyclically from 0 to 15 in an increasing order of first frequency. Therefore, all the REs, except REs carrying the EPDCCH DMRS, in the PRB pair has any one of numbers 0 to 15. All REs with number i in that PRB pair constitutes EREG number i. As described above, it is noted that EREGs are distributed on frequency and time axes within the PRB pair and an EPDCCH transmitted using aggregation of one or more ECCEs, each of which includes a plurality of EREGs, is also distributed on frequency and time axes within the PRB pair.

The number of ECCEs used for one EPDCCH depends on the EPDCCH format as given by Table 9, the number of EREGs per ECCE is given by Table 10. Table 9 shows an example of supported EPDCCH formats, and Table 10 shows an example of the number of EREGs per ECCE, $N^{EREG}_{ECCE}$. Both localized and distributed transmission is supported.

TABLE 9

| | Case A | | Case B | |
|---|---|---|---|---|
| EPDCCH format | Localized transmission | Distributed transmission | Localized transmission | Distributed transmission |
| | Number of ECCEs for one EPDCCH, $N_{ECCE}^{EPDCCH}$ | | | |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

TABLE 10

| Normal cyclic prefix | | Extended cyclic prefix | |
|---|---|---|---|
| Normal subframe | Special subframe, configuration 3, 4, 8 | Special, subframe configuration 1, 2, 6, 7, 9 | Normal subframe | Special subframe, configuration 1, 2, 3, 5, 6 |
| 4 | | | 8 | |

An EPDCCH may use either localized or distributed transmission, differing in the mapping of ECCEs to EREGs and PRB pairs. One or two sets of PRB pairs which a UE shall monitor for EPDCCH transmissions may be configured. All EPDCCH candidates in EPDCCH set $S_p$ (i.e., EPDCCH-PRB-set) use either only localized or only distributed transmission as configured by higher layers. Within EPDCCH set $S_p$ in subframe k, the ECCEs available for transmission of EPDCCHs are numbered from 0 to $N_{ECCE,p,k}-1$. ECCE number n is corresponding to the following EREG(s):

EREGs numbered $(n \bmod N_{ECCE_{RB}})+jN_{RB}^{ECCE}$ in PRB index floor$(n/N_{RB}^{ECCE})$ for localized mapping, and EREGs numbered floor $(n/N_{RB}^{Sm})+jN_{RB}^{ECCE}$ in PRB indices $(n+j\max(1,N_{RB}^{Sp}/N_{ECCE}^{EREG}))\bmod N_{RB}^{Sp}$ for distributed mapping, where $j=0, 1, \ldots, N_{ECCE}^{EREG}-1$, $N_{ECCE}^{EREG}$ is the number of EREGs per ECCE, and $N_{RB}^{ECCE}=16/N_{ECCE}^{EREG}$ is the number of ECCEs per RB pair. The PRB pairs constituting EPDCCH set $S_p$ are assumed to be numbered in ascending order from 0 to $N_{RB}^{Sp}-1$.

Case A in Table 9 applies when:

DCI formats 2, 2A, 2B, 2C or 2D is used and $N_{RB}^{DL}>25$, or any DCI format when $n_{EPDCCH}<104$ and normal cyclic prefix is used in normal subframes or special subframes with configuration 3, 4, 8.

Otherwise case 2 is used. The quantity $n_{EPDCCH}$ for a particular UE is defined as the number of downlink resource elements (k,l) in a PRB pair configured for possible EPDCCH transmission of EPDCCH set $S_0$ and fulfilling all of the following criteria, they are part of any one of the 16 EREGs in the physical resource-block pair, they are assumed by the UE not to be used for CRSs or CSI-RSs, the index l in a subframe fulfils $l \geq l_{EPDCCHStart}$.

where $l_{EPDCCHStart}$ is given based on higher layer signaling 'epdcch-StartSymbol-r11', higher layer signaling 'pdsch-Start-r11', or CFI value carried by PCFICH.

The mapping to resource elements (k,l) on antenna port p meeting the criteria above is in increasing order of first the index k and then the index l, starting with the first slot and ending with the second slot in a subframe.

For localized transmission, the single antenna port p to use is given by Table 11 with $n'=n_{ECCE,low} \bmod N_{RB}^{ECCE}+r_{RNTI} \bmod \min(N_{EPDCCH}^{ECCE}, N_{RB}^{EECCE})$, where $n_{ECCE,low}$ is the lowest ECCE index used by this EPDCCH transmission in the EPDCCH set, $n_{RNTI}$ corresponds to the RNTI associated with the EPDCCH transmission, and $N_{EPDCCH}^{ECCE}$ is the number of ECCEs used for this EPDCCH.

TABLE 11

| | Normal cyclic prefix | | |
|---|---|---|---|
| n' | Normal subframes, Special subframes, configurations 3, 4, 8 | Special subframes, configurations 1, 2, 6, 7, 9 | Extended cyclic prefix Any subframe |
| 0 | 107 | 107 | 107 |
| 1 | 108 | 109 | 108 |
| 2 | 109 | — | — |
| 3 | 110 | — | — |

For distributed transmission, each resource element in an EREG is associated with one out of two antenna ports in an alternating manner where $p \in \{107, 109\}$ for normal cyclic prefix and $p \in \{107, 108\}$ for extended cyclic prefix Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE may effectively receive a signal transmitted by the eNB. For example, the PDCCH and PDSCH may be transmitted to the MTC UE having the coverage issue in a plurality of subframes (e.g. about 100 subframes).

FIG. 7 illustrates an exemplary signal band for MTC.

As one method of reducing the cost of an MTC UE, the MTC UE may operate in, for example, a reduced DL and UL bandwidths of 1.4 MHz regardless of the system bandwidth when the cell operates. In this case, a sub-band (i.e., narrowband) in which the MTC UE operates may always be positioned at the center of a cell (e.g., 6 center PRBs) as shown in FIG. 7(a), or multiple sub-bands for MTC may be provided in one subframe to multiplex MTC UEs in the subframe, as shown in FIG. 7(b), such that the UEs use different sub-bands or use the same sub-band which is not a sub-band consisting of the 6 center PRBs.

In this case, the MTC UE may not normally receive a legacy PDCCH transmitted through the entire system bandwidth, and therefore it may not be preferable to transmit a PDCCH for the MTC UE in an OFDM symbol region in which the legacy PDCCH is transmitted, due to an issue of multiplexing with a PDCCH transmitted for another UE. As one method to address this issue, introduction of a control channel transmitted in a sub-band in which MTC operates for the MTC UE is needed. As a DL control channel for such low-complexity MTC UE, a legacy EPDCCH may be used. Alternatively, an M-PDCCH, which is a variant of the legacy PDCCH/EPDCCH, may be introduced for the MTC UE.

A data channel (e.g., PDSCH, PUSCH) and/or control channel (e.g., M-PDCCH, PUCCH, PHICH) may be transmitted across multiple subframes to implement coverage enhancement (CE) of the UE, using a repetition technique or TTI bundling technique. On behalf of the CE, a control/data channel may be transmitted additionally using techniques such as cross-subframe channel estimation and frequency (narrowband) hopping. Herein, the cross-subframe channel estimation refers to a channel estimation technique using not only a reference signal in a subframe having a corresponding channel but also a reference signal in neighboring subframe(s).

The MTC UE may need CE up to, for example, 15 dB. However, not all MTC UEs are present in an environment which requires CE. In addition, the QoS requirements for MTC UEs are not identical. For example, devices such as a sensor and a meter have a low mobility and a small amount of data to transmit/receive and are very likely to be positioned in a shaded area. Accordingly, such devices may need high CE. On the other hand, wearable devices such as a smart watch may have mobility and are very likely to have a relatively large amount of data to transmit/receive and to be positioned in a place other than the shaded area. Accordingly, not all MTC UEs need a high level of CE, and the required capability may depend on the type of an MTC UE.

According to LTE-A Rel-13, CE may be divided into two modes. In a first mode (referred to as CE mode A), transmission may not be repeated or may be repeated only a few times. In a second mode (or CE mode B), many repetitions of transmission are allowed. A mode to enter between the two modes may be signaled to the MTC UE. Herein, parameters that a low-complexity/low-cost UE assumes for transmission/reception of a control channel/data channel may depend on the CE mode. In addition, the DCI format which the low-complexity/low-cost UE monitors may depend on the CE mode. Transmission of some physical channels may be repeated the same number of times regardless of whether the CE mode is CE mode A or CE mode B.

In the present invention, the eNB may configure repetitive transmission/reception of PDCCH, PDSCH, PUCCH and/or PUSCH (hereinafter, PDCCH/PDSCH/PUCCH/PUSCH) for the MTC UE. For example, the eNB may provide the MTC UE with configuration information about frequency resources with repetition of PDCCH/PDSCH/PUCCH/PUSCH, time resources (e.g., subframes) with repetition of PDCCH/PDSCH/PUCCH/PUSCH, a (maximum) number of repetitions, and/or a repetition start subframe. The eNB may repeatedly transmit a PDCCH/PDSCH by transmitting the PDCCH/PDSCH in each of a plurality of subframes according to the configuration information, and the UE may repeatedly receive the PDCCH/PDSCH in each of a plurality of subframes according to the configuration information. The UE may repeatedly transmit a PUCCH/PUSCH by transmitting the PDCCH/PDSCH in each of a plurality of subframes according to the configuration information, and the eNB may repeatedly receive the PUCCH/PUSCH in each of a plurality of subframes according to the configuration information.

An LTE cell operates at a bandwidth of at least 6 RBs. In order to further lower the unit price of the MTC UE, an environment in which the MTC UE operates through a narrow bandwidth of about 200 kHz may be considered. Such an MTC UE, i.e., an MTC UE capable of operating only within a narrow bandwidth, may operate with backward compatibility within a legacy cell with a bandwidth greater than 200 kHz. A clean frequency band in which no legacy cell is present may be deployed only for the MTC UE.

In the present invention, a system operating through a narrowband of about one PRB within a legacy cell having a bandwidth wider than 200 kHz is referred to as in-band NB (narrowband) IoT (Internet of things). In particular, a system operating through a narrowband of about one PRB only for the MTC UE in a clean frequency band which does not have the legacy cell is referred to as stand-alone NB IoT. IoT refers to internetworking of electronics, software, sensors, physical devices having actuators and network connectivity, connected devices, smart devices, buildings and other items, which enable corresponding objects to collect and exchange data. In other words, IoT refers to a network of physical objects, machines, humans and other devices, which enable connectivity and communication for exchange of data for IoT intelligent applications and services. IoT allows objects to remotely perform the sensing and control operations through existing network infrastructure, thereby providing opportunities for direct integration between the physical world and the digital world, which leads to improved efficiency, accuracy and economic benefits. In particular, IoT employing the 3GPP technology is referred to as cellular IoT (CIoT).

NB-IoT allows access to network services through E-UTRA having a limited channel bandwidth of 180 kHz. NB-IoT may be considered as IoT operating on a PRB-by-PRB basis.

To specify a radio access for CIoT, based to a great extent on a non-backward-compatible variant of E-UTRA, the following characteristics may be addressed:
improved indoor coverage,
support for massive number of low throughput devices,
low delay sensitivity, ultra low device cost,
low device power consumption and (optimised) network architecture.

In the following description, a radio resource with the size of one RB operating for NB-IoT will be referred to as an NB-IoT cell or NB-LTE cell, and a system supporting an NB-IoT cell operating on one RB will be referred to as an NB-IoT system or NB-LTE system.

In addition, an LTE radio resource on which communication is performed according to the LTE system will be referred to as an LTE cell, and a GSM radio resource on which communication is performed according to the GSM system will be referred to as a GSM cell. An in-band NB IoT cell may operate with a bandwidth of 200 kHz (in consideration of a guard band) or 180 kHz (when the guard band is not considered) in the system band of an LTE cell.

The present invention proposes a method of providing, by the eNB, a service to a narrowband device having a narrowband RF capability while providing a service to a UE having a wideband RF capability in a wideband system. Herein, the wideband refers to a band of at least 1.4 Mhz.

The present invention proposes a method of receiving a service by a narrowband device having a narrowband RF capability in a wideband LTE system, using the limited RF capability thereof while minimizing influence on wideband UEs. In the following description of the present invention, a UE supporting NB-IoT will be referred to as an NB-IoT UE or NB-LTE UE.

In embodiments of the present invention described below, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

The LTE system has the following two types of services/UEs for an MTC/IoT service.

MTC (BL/CE UE): A service/UE having reduced cost/power consumption and enhanced coverage has been introduced for the MTC service of the LTE/LTE-A. To this end, the following techniques have been introduced.

Cost reduction
  Single Rx/RF chain (Rel-12)
  Peak rate reduction (Rel-12)
  HD-FDD with single oscillator (Rel-12)
  Bandwidth reduction (Rel-13)
  Maximum UE transmit power (Rel-13)
Reduced power consumption
  New Power Save Mode (Rel-12)
  Relaxed measurement (Rel-12, Rel-13)
Coverage enhancement: ~15 dB
  Repetition (Rel-13)
  PSD boosting (Rel-13)
  Relaxed requirement (Rel-13)

Herein, the bandwidth of the MTC UE has been reduced to 6 RBs. This UE is generally called a bandwidth limited (BL)/coverage enhanced (CE) UE.

NB-IoT (NB-IoT UE): A service/UE operating based on the in-band/guard-band operation and stand-alone operation of the LTE/LTE-A cell is introduced for the cellular IoT service, targeting further reduction in cost/power consumption than in MTC. To this end, the following techniques are considered along with the techniques considered for MTC.

Bandwidth reduction (targeting 180 kHz),
New modulation scheme/RS design for peak-to-average power ratio (PAPR) reduction, and
Multi/single-tone transmission for PSD boosting.

The present invention proposes a DCI format and DCI design/contents for IoT UEs in an NB-LTE environment in which the MTC UE operates in a narrow band of about 180 KHz. In the present invention, a physical downlink control channel for the-IoT UE is called an NB-PDCCH and a PDSCH/PUSCH for the-IoT UE is called an NB-PDSCH/NB-PUSCH. The PDCCH, PDSCH, and PUSCH mentioned below may refer to PDCCH, PDSCH, and PUSCH for NB-IoT.

For simplicity, it is assumed in the following description that the IoT UE operates in a system deployed for IoT UEs. However, it is apparent that the present invention may also be applied to other UEs and systems.

Transmission/reception of scheduling information about a downlink data channel in a subframe different from a subframe in which the downlink data channel is present, or transmission/reception of scheduling information about an uplink data channel in a subframe which is not linked to a subframe in which the uplink data channel is present is called cross-subframe scheduling. The cross-subframe scheduling may be applied to UEs such as the MTC/IoT UE to which CE is applied or low complexity/low cost UEs. In the present invention, a method of configuring the size of a gap subframe between a control channel and a data channel when cross-subframe scheduling is performed on a UE is proposed. Here, the term "gap subframe" means a gap between a subframe having a control channel and a subframe having a data channel scheduled by the control channel. Hereinafter, the timing of the PDCCH and the corresponding scheduled PDSCH will be described, but the present invention may be equally applied to configuring the timing of the PDCCH and the corresponding scheduled PUSCH.

FIG. 8 and FIG. 9 show a position where transmission of a control channel may start and a position where the control channel may end according to the number R of repetitions of the control channel. Hereinafter, the number of repetitions, R, is called the repetition number.

In NB-IoT, the NB-PDCCH may be transmitted within one NB-PDCCH search space according to one of a plurality of repetition numbers, as shown in FIG. 8. FIG. 8 illustrates a case where the repetition number R of the NB-PDCCH may be $R_{max}/8$, $R_{max}/4$, $R_{max}/2$ or $R_{max}$. For example, the NB-PDCCH configured with a repetition number R is transmitted R times in total. When the NB-PDCCH is mapped in one subframe, the NB-PDCCH configured with the repetition number R is transmitted in each of R (contiguous or non-contiguous) subframes. In this case, $R_{max}$ denotes the maximum repetition number by which the NB-PDCCH may be transmitted. The position of the start subframe, which is the subframe in which transmission of the NB-PDCCH may be started, may depend on the value of R. That is, the position of the subframe where the repetition of the NB-PDCCH may start may depend on R. For example, transmission of an NB-PDCCH configured with the repetition number R may start in every R subframe(s). In other words, in view of a UE, a position where transmission of the NB-PDCCH may start is present in every R subframes in the NB-PDCCH search space. Thus, the smaller the value of R for a given period of time, the more transmission opportunities are available for the control channel(s). Since the time length of the NB-PDCCH search space is equal to $R_{max}$, only one NB-PDCCH with $R=R_{max}$ may be transmitted within the NB-PDCCH search space. In other words, a plurality of NB-PDCCHs with $R=R_{max}$ cannot be subjected to TDM in the NB-PDCCH search space with a time length of $R_{max}$.

Therefore, the time-domain positions at which transmission of the NB-PDCCH may end in the NB-PDCCH search space are $R_{max}/8$, $(R_{max}/8)*2$, $(R_{max}/8)*3$, $(R_{max}/8)*4$, $(R_{max}/8)*5$, $(R_{max}/8)*6$, $(R_{max}/8)*7$, and $(R_{max}/8)*8$, as shown in FIG. 9.

FIG. 10 illustrates a transmission timing relationship between PDCCH and PDSCH according to the cross-subframe scheduling.

In a search space for the NB-PDCCH to which repetition is applied, a plurality of DL grants may be transmitted and the respective PDSCHs scheduled by the DL grants may be subjected to time division multiplexing (TDM) in the time domain and transmitted. For example, as shown in FIG. 10, if PDSCH 1 is scheduled by PDCCH 1 and PDSCH 2 is scheduled by PDCCH 2, PDSCH 1 and PDSCH 2 may be subjected to TDM in order in the time domain and transmitted. However, if the size of the subframe gap is fixed between the subframe in which the (same) PDCCH is received last and the subframe in which reception of the corresponding scheduled PDSCH is started, PDSCHs scheduled by different PDCCHs may overlap.

FIG. 11 shows transmission start positions of the PDSCH according to an embodiment of the present invention.

In order to prevent overlapping of the PDSCHs, transmission start timing of the PDSCH may be flexibly adjusted. In order to flexibly adjust the transmission start timing of the PDSCH, the transmission timing of the PDSCH or the size of the subframe gap between the last subframe of the PDCCH and the first subframe of the PDCCH may be flexibly indicated through the DCI. In this case, in order to reduce signaling overhead, predetermined values for the subframe gap may be predefined, instead of an arbitrary value being selected as the size of the subframe gap. If the subframe gap can be set to an arbitrary size, overhead of the minimum ceil $\{\log_2 X\}$ bits is generated according to the maximum size X that may be a subframe gap. On the other hand, if candidates of the size of the subframe gap are predetermined, only overhead of ceil $\{\log_2 Y\}$ bits is generated according to the number Y of candidates smaller than the maximum size X of the subframe gap.

Predetermining the candidate sizes of the subframe gap may mean that the possible start subframes of the scheduled PDSCH are also predetermined. For example, as shown in FIG. 11, there may be possible start subframe positions of the scheduled PDSCH according to the position of the last subframe with the last transmission of the PDCCH. Of the possible start subframe positions, a subframe position at which transmission of the PDSCH actually begins may be indicated through the DCI.

In an embodiment of the present invention, a specific method of indicating the size of the subframe gap between the last subframe of the PDCCH and the first subframe of the scheduled PDSCH through the DCI is proposed.

FIG. 12 shows transmission start positions of the PDSCH according to another embodiment of the present invention.

In order to transmit a plurality of PDCCHs or PDSCHs with less waste of resources, a subframe position at which transmission of the PDSCH may be started needs to be appropriately specified.

Within the NB-PDCCH search space, the position of a PDSCH transmission start subframe may be determined according to y, $(R_{max}/8)+y$, $((R_{max}/8)*2)+y$, $((R_{max}/8)*3)+y, \ldots$, as shown in FIG. 12. For example, in the NB-PDCCH search space, the PDSCH transmission start subframe position may be the '$((R_{max}/8)*x)+y$'-th subframe (where x=0, 1, 2, 3, . . . ) from subframe $k_0$. That is, in the NB-PDCCH search space, subframe $k_0+((R_{max}/8)*x)+y$ may be the PDSCH transmission start subframe. Here, y, which denotes the minimum gap size between PDCCH transmission and PDSCH transmissions, may be 4. Alternatively, in the NB-PDCCH search space, the PDSCH transmission start subframe position may be the 4-th, '$R_{max}/8$'-th, '$(R_{max}/8)*2$'-th, '$(R_{max}/8)*3$'-th, . . . subframes from the subframe position where transmission of the PDCCH is completed. That is, timing may be determined with a cycle of $R_{max}/8$ or $R_{max}/N$ such that the scheduled PDSCH may be transmitted immediately after another PDCCH is transmitted in the NB-PDCCH search space. Here, N may be a value predefined in the standard document or a value configured by a higher layer.

On the other hand, after the NB-PDCCH search space is terminated, the subframe in which the PDSCH is transmittable may be determined according to the transmission time length of the PDSCH as shown in FIG. 12. For example, after the NB-PDCCH search space ends, the PDSCH transmission start subframe position may be configured with periodicity D. Here, the value of D may be 1) the repetition number of the scheduled PDSCH, 2) the minimum repetition number ($=D_{min}$) of the PDSCH that may be configured by the DCI, 3) the maximum repetition number of the PDSCH that may be configured by the DCI ($=D_{max}$), 4) $D_{min}*N$ (where N is a positive integer), or 5) $D_{max}/N$ (where N is a positive integer). Here, N may be a value predefined in the standard document or a value configured by a higher layer.

In the present invention, it is proposed that one of the possible PDSCH transmission start subframe positions with a periodicity corresponding to $R_{max}/8$ (or a multiple or divisor of $R_{max}$) and the possible PDSCH transmission start subframe positions with a periodicity corresponding to D be indicated through DCI. For the possible start positions of the PDSCH, which may be indicated by the DCI, the size m of the subframe gap between the subframe (i.e., the last subframe n of the PDCCH) in which transmission of the PDCCH ends and the subframe (i.e., the first subframe n+m of the scheduled PDSCH) in which transmission of the PDSCH may start include values having a periodicity of $R_{max}/8$ (or a multiple or divisor of $R_{max}$) and values having a periodicity corresponding to D.

For example, the position of the PDSCH start subframe from the PDCCH end subframe position according to the value of the DCI field for indicating the position of the PDSCH start subframe may be determined according to the following table.

TABLE 12

| | DCI field value | | | | | | | |
|---|---|---|---|---|---|---|---|---|
| | 0 | 1 | 2 | 3 | 4 | 5 | 6 | 7 |
| PDSCH start subframe position | 4 | 4 + $R_{max}/8$ | 4 + $(R_{max}/8)*2$ | 4 + $(R_{max}/8)*3$ | 4 + $(R_{max}/8)*3 + D$ | 4 + $(R_{max}/8)*3 + D*2$ | 4 + $(R_{max}/8)*3 + D*3$ | 4 + $(R_{max}/8)*3 + D*4$ |

For example, referring to Table 12, if the UE receives the PDCCH in the subframe n for the last time, and the value of the DCI field for the PDSCH start subframe position among the fields in the DCI carried by the PDCCH is set to 1, the UE receives the PDSCH scheduled by the PDCCH from subframe 'n+4+$R_{max}$/8'. In other words, the UE may consider a signal received on a resource allocated by the PDCCH as the signal of the PDSCH and decode the same, starting in subframe 'n+4+$R_{max}$/8'. If the repetition operation is applied to transmission of the PDSCH, the number of subframes having the PDSCH may be configured by the PDCCH or a higher layer.

FIG. 13 shows transmission start positions of the PDSCH according to another embodiment of the present invention.

In another embodiment of the present invention, it is proposed that the positions of the PDSCH transmission start subframes configurable by the DCI be changed according to the position of the subframe where transmission of the PDCCH ends. In FIG. 12 and Table 12, the set of gap sizes that may be configured by the DCI is always the same. On the other hand, in FIG. 13, the set of gap sizes that may be configured by the DCI may be changed according to the position of the PDCCH transmission end subframe. For example, as shown in FIG. 13, when the number of subframes from the start subframe of the search space to the transmission end subframe of the PDCCH is k, the PDSCH transmission start subframe set which may be configured by the DCI may vary according to subframe n in which transmission of the PDCCH ends. In other words, when the start subframe of the search space is subframe $k_0$, the PDSCH transmission start subframe set that may be configured with the DCI may be changed according to the transmission end subframe $k_0$+k of the PDCCH.

The PDCCH search space for the UE for which repetition of the channel transmission/reception is configured may start in a predetermined subframe rather than in any subframe. For example, the start subframe $k_0$ of the PDCCH search space for a UE for which repetition of channel transmission/reception is configured, the MTC UE, or the NB-IoT UE may be configured by a higher layer or by a predetermined rule.

Referring to FIG. 13, the position indicated by a line corresponding to "the ending of NB-PDCCH" represents a point at which transmission of the PDCCH ends, and the positions indicated by a line corresponding to "possible start positions of NB-PDSCH" represent positions of possible PDSCH transmission start subframes according to the position of the transmission end subframe of the PDCCH. According to the present invention, as shown in FIG. 13, possible transmission start positions of PDSCH scheduled by PDCCHs having different values of n may be aligned.

The following table exemplarily shows possible PDSCH transmission start subframes that may be configured by DCI according to the embodiment of FIG. 13. In other words, the following table exemplarily shows subframe gap m between PDCCH transmission end subframe $k_0$+k (hereinafter, subframe n) and PDSCH start subframe n+m according to the embodiment of FIG. 13. Here, subframe $k_0$ represents the start subframe of the PDCCH search space. In this embodiment, as illustrated in the following table, the PDSCH transmission start subframe set that may be configured by the DCI may be changed according to the position of PDCCH transmission end subframe n, that is, the value of k. The eNB may configure the position of one of the subframes in the PDSCH start subframe set for the UE through the DCI.

TABLE 13

| | | DCI field value | | | | | | | |
|---|---|---|---|---|---|---|---|---|---|
| | | 0 | 1 | 2 | 3 | 4 | 5 | 6 | 7 |
| k | $R_{max}$/8 | 4 | 4 + $R_{max}$/8 | 4 + ($R_{max}$/8) * 2 | 4 + ($R_{max}$/8) * 3 | 4 + ($R_{max}$/8) * 4 | 4 + ($R_{max}$/8) * 5 | 4 + ($R_{max}$/8) * 6 | 4 + ($R_{max}$/8) * 7 |
| | ($R_{max}$/8) * 2 | 4 | 4 + $R_{max}$/8 | 4 + ($R_{max}$/8) * 2 | 4 + ($R_{max}$/8) * 3 | 4 + ($R_{max}$/8) * 4 | 4 + ($R_{max}$/8) * 5 | 4 + ($R_{max}$/8) * 6 | 4 + ($R_{max}$/8) * 6 + D |
| | ($R_{max}$/8) * 3 | 4 | 4 + $R_{max}$/8 | 4 + ($R_{max}$/8) * 2 | 4 + ($R_{max}$/8) * 3 | 4 + ($R_{max}$/8) * 4 | 4 + ($R_{max}$/8) * 5 | 4 + ($R_{max}$/8) * 5 + D | 4 + ($R_{max}$/8) * 5 + D * 2 |
| | ($R_{max}$/8) * 4 | 4 | 4 + $R_{max}$/8 | 4 + ($R_{max}$/8) * 2 | 4 + ($R_{max}$/8) * 3 | 4 + ($R_{max}$/8) * 4 | 4 + ($R_{max}$/8) * 4 + D | 4 + ($R_{max}$/8) * 4 + D * 2 | 4 + ($R_{max}$/8) * 4 + D * 3 |
| | ($R_{max}$/8) * 5 | 4 | 4 + $R_{max}$/8 | 4 + ($R_{max}$/8) * 2 | 4 + ($R_{max}$/8) * 3 | 4 + ($R_{max}$/8) * 3 + D | 4 + ($R_{max}$/8) * 3 + D * 2 | 4 + ($R_{max}$/8) * 3 + D * 3 | 4 + ($R_{max}$/8) * 3 + D * 4 |
| | ($R_{max}$/8) * 6 | 4 | 4 + $R_{max}$/8 | 4 + ($R_{max}$/8) * 2 | 4 + ($R_{max}$/8) * 2 + D | 4 + ($R_{max}$/8) * 2 + D * 2 | 4 + ($R_{max}$/8) * 2 + D * 3 | 4 + ($R_{max}$/8) * 2 + D * 4 | 4 + ($R_{max}$/8) * 2 + D * 5 |
| | ($R_{max}$/8) * 7 | 4 | 4 + $R_{max}$/8 | 4 + ($R_{max}$/8) + D | 4 + ($R_{max}$/8) + D * 2 | 4 + ($R_{max}$/8) + D * 3 | 4 + ($R_{max}$/8) + D * 4 | 4 + $R_{max}$/8 + D * 5 | 4 + $R_{max}$/8 + D * 6 |
| | ($R_{max}$/8) * 8 | 4 | 4 + D | 4 + D * 2 | 4 + D * 3 | 4 + D * 4 | 4 + D * 5 | 4 + D * 6 | 4 + D * 7 |

In Table 13, D has a value related to repetition of the PDSCH as described above. For example, the value of D may be 1) the repetition number of the scheduled PDSCH, 2) the minimum repetition number ($=D_{min}$) of the PDSCH, that may be configured by the DCI, 3) the maximum repetition number of the PDSCH, that may be configured by the DCI ($=D_{max}$), 4) $D_{min}$*N (where N is a positive integer), or 5) $D_{max}$/N (where N is a positive integer).

Suppose that the start subframe of the PDCCH search space is subframe k0. Referring to Table 13, for example, the UE that has received a PDCCH in subframe n corresponding to k=($R_{max}$/8)*6 for the last time, i.e., the UE that has received a PDCCH in subframe $k_0$+k for the last time, may start to receive the corresponding PDSCH at one of the 8 candidate values corresponding to k=($R_{max}$/8)*6. When the value of the DCI field indicating the start subframe of the PDSCH and carried by the PDCCH is 4, the UE may start to receive the corresponding PDSCH after 4+($R_{max}$/8)*2+D*2 subframes from subframe n (=subframe $k_0$+k), i.e., start to receive the corresponding PDSCH from subframe 'n+4+($R_{max}$/8)*2+D*2'.

The value of k may be determined by the maximum repetition number $R_{max}$ of the PDCCH and a repetition number given through the PDCCH. The maximum repetition number $R_{max}$ of the PDCCH may be configured by a higher layer or may be predefined. For example, the DCI subframe repetition field may be included in DCI carried by the PDCCH, and the DCI subframe repetition field may indicate one of the candidate values of k. Alternatively, the DCI subframe repetition field may be included in the DCI carried by the PDCCH, and the DCI subframe repetition field may indicate the repetition number R of one of the repetition number candidates of the PDCCH. When it is assumed that the PDCCH is received R times in series from start subframe $n_0$ of the PDCCH, the subframe $n_0+R$ may be subframe $k_0+k$=subframe n.

The possible transmission start subframe position of NB-PUSCH may conform to a method of indicating the subframe transmission start position of the NB-PDSCH. Alternatively, since the NB-PDCCH is not transmitted on an uplink carrier on which the NB-PUSCH is transmitted, the possible transmission subframe position of the NB-PUSCH may be given the repetition number of the NB-PUSCH or a multiple (or divisor) of the minimum (or maximum) repetition number of the NB-PUSCH as periodicity thereof.

FIG. 14 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna may be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor may be configured to schedule the downlink channel or the uplink channel of a UE within a limited bandwidth (e.g., 1 RB). The eNB processor may configure or schedule the channel of the UE such that the channel of the UE is repeatedly transmitted/received in each of a plurality of subframes. The eNB processor may control eNB RF unit to transmit information on a narrow band to which the channel of the UE may be allocated or scheduled and/or subframe(s) information to which the repetition of the UE may be applied or is applied, and/or information on the (maximum) number of repetitions. The eNB processor may control the eNB RF unit to transmit a downlink grant carrying scheduling information of a downlink channel or an uplink grant carrying scheduling information of a uplink channel. The eNB processor may schedule transmission of the downlink channel according to the downlink grant or schedule reception of the uplink channel according to the uplink grant.

The UE processor may control the UE RF unit to receive the downlink channel or transmit the uplink channel within a limited bandwidth (e.g., 6 RBs, 1 RB, etc.). The UE processor may control the UE RF unit to receive configuration or scheduling information on a channel repeatedly transmitted/received in each of a plurality of subframes. The UE processor may control the UE RF unit to receive information about a narrow band to which a channel for the UE may be allocated or scheduled, and/or subframe(s) information to which repeated transmission/reception from/to the UE is applied or applicable, and/or information about the (maximum) number of repetitions. The UE processor may control the UE RF unit to receive a downlink grant carrying scheduling information of a downlink channel or an uplink grant carrying scheduling information of an uplink channel. The UE processor may control the UE RF unit to perform reception of the downlink channel according to the downlink grant or to perform transmission of the uplink channel according to the uplink grant.

The eNB processor according to the present invention may control the eNB RF unit to transmit configuration information to the UE according to one of the proposals of the present invention described above. The eNB processor may control the eNB RF unit to transmit a downlink control/data channel according to one of the proposals of the present invention. The eNB processor may control the eNB RF unit to receive an uplink control/data channel according to one of the proposals of the present invention.

The UE processor according to the present invention may control the UE RF unit to receive configuration information according to one of the proposals of the present invention described above. The UE processor may control the UE RF unit to receive a downlink control/data channel according to one of the proposals of the present invention. The UE processor may control the UE RF unit to transmit an uplink control/data channel according to one of the proposals of the present invention.

As described above, the detailed description of the preferred embodiments of the present invention has been given to enable those skilled in the art to implement and practice the invention. Although the invention has been described with reference to exemplary embodiments, those skilled in the art will appreciate that various modifications and variations may be made in the present invention without departing from the spirit or scope of the invention described in the appended claims. Accordingly, the invention should not be limited to the specific embodiments described herein, but should be accorded the broadest scope consistent with the principles and novel features disclosed herein.

What is claimed is:

1. A method of receiving a downlink channel by a user equipment, the method comprising:

receiving a physical downlink control channel (PDCCH) carrying downlink control information (DCI) in a PDCCH search space R times, wherein R is a positive integer; and receiving a physical downlink shared channel (PDSCH) starting from subframe l after subframe n, in which the PDCCH is received last, based on the DCI, wherein the DCI includes information indicating the subframe l among possible PDSCH start positions, wherein the possible PDSCH start positions are determined based on a ratio of a maximum number of PDCCH repetitions $R_{max}$ in the PDCCH search space and are determined based on a ratio of the number of times D related to repetition of the PDSCH after the PDCCH search space, wherein the information indicating the subframe l in the DCI indicates the number m of subframes from the subframe n to the subframe l, wherein the subframe n is subframe $k_0+k$, the subframe $k_0+k$ being a k-th subframe from start subframe $k_0$ of the PDCCH search space, wherein k is a multiple of ($R_{max}/8$), and wherein m is given by the following table:

| | DCI field value for PDSCH start subframe | | | |
|---|---|---|---|---|
| m | 0 | 1 | 2 | 3 |
| k $R_{max}/8$ | 4 | 4 + $R_{max}/8$ | 4 + ($R_{max}/8$) * 2 | 4 + ($R_{max}/8$) * 3 |
| ($R_{max}/8$) * 2 | 4 | 4 + $R_{max}/8$ | 4 + ($R_{max}/8$) * 2 | 4 + ($R_{max}/8$) * 3 |
| ($R_{max}/8$) * 3 | 4 | 4 + $R_{max}/8$ | 4 + ($R_{max}/8$) * 2 | 4 + ($R_{max}/8$) * 3 |
| ($R_{max}/8$) * 4 | 4 | 4 + $R_{max}/8$ | 4 + ($R_{max}/8$) * 2 | 4 + ($R_{max}/8$) * 3 |
| ($R_{max}/8$) * 5 | 4 | 4 + $R_{max}/8$ | 4 + ($R_{max}/8$) * 2 | 4 + ($R_{max}/8$) * 3 |
| ($R_{max}/8$) * 6 | 4 | 4 + $R_{max}/8$ | 4 + ($R_{max}/8$) * 2 | 4 + ($R_{max}/8$) * 2 + D |
| ($R_{max}/8$) * 7 | 4 | 4 + $R_{max}/8$ | 4 + ($R_{max}/8$) + D | 4 + ($R_{max}/8$) + D * 2 |
| ($R_{max}/8$) * 8 | 4 | 4 + D | 4 + D * 2 | 4 + D * 3 |

| | DCI field value for PDSCH start subframe | | | |
|---|---|---|---|---|
| m | 4 | 5 | 6 | 7 |
| k $R_{max}/8$ | 4 + ($R_{max}/8$) * 4 | 4 + ($R_{max}/8$) * 5 | 4 + ($R_{max}/8$) * 6 | 4 + ($R_{max}/8$) * 7 |
| ($R_{max}/8$) * 2 | 4 + ($R_{max}/8$) * 4 | 4 + ($R_{max}/8$) * 5 | 4 + ($R_{max}/8$) * 6 | 4 + ($R_{max}/8$) * 6 + D |
| ($R_{max}/8$) * 3 | 4 + ($R_{max}/8$) * 4 | 4 + ($R_{max}/8$) * 5 | 4 + ($R_{max}/8$) * 5 + D | 4 + ($R_{max}/8$) * 5 + D * 2 |
| ($R_{max}/8$) * 4 | 4 + ($R_{max}/8$) * 4 | 4 + ($R_{max}/8$) * 4 + D | 4 + ($R_{max}/8$) * 4 + D * 2 | 4 + ($R_{max}/8$) * 4 + D * 3 |
| ($R_{max}/8$) * 5 | 4 + ($R_{max}/8$) * 3 + D | 4 + ($R_{max}/8$) * 3 + D * 2 | 4 + ($R_{max}/8$) * 3 + D * 3 | 4 + ($R_{max}/8$) * 3 + D * 4 |
| ($R_{max}/8$) * 6 | 4 + ($R_{max}/8$) * 2 + D * 2 | 4 + ($R_{max}/8$) * 2 + D * 3 | 4 + ($R_{max}/8$) * 2 + D * 4 | 4 + ($R_{max}/8$) * 2 + D * 5 |
| ($R_{max}/8$) * 7 | 4 + ($R_{max}/8$) + D * 3 | 4 + ($R_{max}/8$) + D * 4 | 4 + $R_{max}/8$ + D * 5 | 4 + $R_{max}/8$ + D * 6 |
| ($R_{max}/8$) * 8 | 4 + D * 4 | 4 + D * 5 | 4 + D * 6 | 4 + D * 7. |

2. The method of claim 1, wherein D is the number of repetitions of the PDSCH, a minimum repetition number (=$D_{min}$) of the PDSCH which is configurable by the DCI, a maximum repetition number of the PDSCH which is configurable by the DCI, $D_{min}$*N, or $D_{max}/N$, wherein N is a positive integer.

3. A user equipment for receiving a downlink channel, comprising:

a radio frequency (RF) unit; and a processor configured to control the RF unit, wherein the processor is configured to:

control the RF unit to receive a physical downlink control channel (PDCCH) carrying downlink control information (DCI) in a PDCCH search space R times, wherein R is a positive integer; and control the RF unit to receive a physical downlink shared channel (PDSCH) starting from subframe l after subframe n, in which the PDCCH is received last, based on the DCI, wherein the DCI includes information indicating the subframe l among possible PDSCH start positions,
wherein the possible PDSCH start positions are determined based on a ratio of a maximum number of PDCCH repetitions $R_{max}$ in the PDCCH search space and are determined based on a ratio of the number of times D related to repetition of the PDSCH after the PDCCH search space,
wherein the information indicating the subframe l in the DCI indicates the number m of subframes from the subframe n to the subframe l,
wherein the subframe n is subframe $k_0+k$, the subframe $k_0+k$ being a k-th subframe from start subframe $k_0$ of the PDCCH search space,
wherein k is a multiple of $(R_{max}/8)$, and
wherein m is given by the following table:

| | | DCI field value for PDSCH start subframe | | | | | | |
|---|---|---|---|---|---|---|---|---|
| m | 0 | 1 | 2 | 3 | 4 | 5 | 6 | 7 |
| k  $R_{max}/8$ | 4 | $4 + R_{max}/8$ | $4 + (R_{max}/8) * 2$ | $4 + (R_{max}/8) * 3$ | $4 + (R_{max}/8) * 4$ | $4 + (R_{max}/8) * 5$ | $4 + (R_{max}/8) * 6$ | $4 + (R_{max}/8) * 7$ |
| $(R_{max}/8) * 2$ | 4 | $4 + R_{max}/8$ | $4 + (R_{max}/8) * 2$ | $4 + (R_{max}/8) * 3$ | $4 + (R_{max}/8) * 4$ | $4 + (R_{max}/8) * 5$ | $4 + (R_{max}/8) * 6$ | $4 + (R_{max}/8) * 6 + D$ |
| $(R_{max}/8) * 3$ | 4 | $4 + R_{max}/8$ | $4 + (R_{max}/8) * 2$ | $4 + (R_{max}/8) * 3$ | $4 + (R_{max}/8) * 4$ | $4 + (R_{max}/8) * 5$ | $4 + (R_{max}/8) * 5 + D$ | $4 + (R_{max}/8) * 5 + D * 2$ |
| $(R_{max}/8) * 4$ | 4 | $4 + R_{max}/8$ | $4 + (R_{max}/8) * 2$ | $4 + (R_{max}/8) * 3$ | $4 + (R_{max}/8) * 4$ | $4 + (R_{max}/8) * 4 + D$ | $4 + (R_{max}/8) * 4 + D * 2$ | $4 + (R_{max}/8) * 4 + D * 3$ |
| $(R_{max}/8) * 5$ | 4 | $4 + R_{max}/8$ | $4 + (R_{max}/8) * 2$ | $4 + (R_{max}/8) * 3$ | $4 + (R_{max}/8) * 3 + D$ | $4 + (R_{max}/8) * 3 + D * 2$ | $4 + (R_{max}/8) * 3 + D * 3$ | $4 + (R_{max}/8) * 3 + D * 4$ |
| $(R_{max}/8) * 6$ | 4 | $4 + R_{max}/8$ | $4 + (R_{max}/8) * 2$ | $4 + (R_{max}/8) * 2 + D$ | $4 + (R_{max}/8) * 2 + D * 2$ | $4 + (R_{max}/8) * 2 + D * 3$ | $4 + (R_{max}/8) * 2 + D * 4$ | $4 + (R_{max}/8) * 2 + D * 5$ |
| $(R_{max}/8) * 7$ | 4 | $4 + R_{max}/8$ | $4 + (R_{max}/8) + D$ | $4 + (R_{max}/8) + D * 2$ | $4 + (R_{max}/8) + D * 3$ | $4 + (R_{max}/8) + D * 4$ | $4 + R_{max}/8 + D * 5$ | $4 + R_{max}/8 + D * 6$ |
| $(R_{max}/8) * 8$ | 4 | $4 + D$ | $4 + D * 2$ | $4 + D * 3$ | $4 + D * 4$ | $4 + D * 5$ | $4 + D * 6$ | $4 + D * 7$. |

4. The user equipment according to claim 3, wherein D is the number of repetitions of the PDSCH, a minimum repetition number $(=D_{min})$ of the PDSCH which is configurable by the DCI, a maximum repetition number of the PDSCH which is configurable by the DCI, $D_{min}*N$, or $D_{max}/N$, wherein N is a positive integer.

5. A method of transmitting a downlink channel by a base station, the method comprising:
transmitting a physical downlink control channel (PDCCH) carrying downlink control information (DCI) in a PDCCH search space R times, wherein R is a positive integer; and
transmitting a physical downlink shared channel (PDSCH) starting from subframe l after subframe n, in which the PDCCH is transmitted last, based on the DCI,
wherein the DCI includes information indicating the subframe l among possible PDSCH start positions,
wherein the possible PDSCH start positions are determined based on a ratio of a maximum number of PDCCH repetitions $R_{max}$ in the PDCCH search space and are determined based on a ratio of the number of times D related to repetition of the PDSCH after the PDCCH search space,
wherein the information indicating the subframe l in the DCI indicates the number m of subframes from the subframe n to the subframe l,
wherein the subframe n is subframe $k_0+k$, the subframe $k_0+k$ being a k-th subframe from start subframe $k_0$ of the PDCCH search space,
wherein k is a multiple of $(R_{max}/8)$, and
wherein m is given by the following table:

| | | DCI field value for PDSCH start subframe | | | | | | |
|---|---|---|---|---|---|---|---|---|
| m | 0 | 1 | 2 | 3 | 4 | 5 | 6 | 7 |
| k  $R_{max}/8$ | 4 | $4 + R_{max}/8$ | $4 + (R_{max}/8) * 2$ | $4 + (R_{max}/8) * 3$ | $4 + (R_{max}/8) * 4$ | $4 + (R_{max}/8) * 5$ | $4 + (R_{max}/8) * 6$ | $4 + (R_{max}/8) * 7$ |
| $(R_{max}/8) * 2$ | 4 | $4 + R_{max}/8$ | $4 + (R_{max}/8) * 2$ | $4 + (R_{max}/8) * 3$ | $4 + (R_{max}/8) * 4$ | $4 + (R_{max}/8) * 5$ | $4 + (R_{max}/8) * 6$ | $4 + (R_{max}/8) * 6 + D$ |

-continued

| m | 0 | 1 | 2 | 3 | 4 | 5 | 6 | 7 |
|---|---|---|---|---|---|---|---|---|
| $(R_{max}/8) * 3$ | 4 | $4 + R_{max}/8$ | $4 + (R_{max}/8) * 2$ | $4 + (R_{max}/8) * 3$ | $4 + (R_{max}/8) * 4$ | $4 + (R_{max}/8) * 5$ | $4 + (R_{max}/8) * 5 + D$ | $4 + (R_{max}/8) * 5 + D * 2$ |
| $(R_{max}/8) * 4$ | 4 | $4 + R_{max}/8$ | $4 + (R_{max}/8) * 2$ | $4 + (R_{max}/8) * 3$ | $4 + (R_{max}/8) * 4$ | $4 + (R_{max}/8) * 4 + D$ | $4 + (R_{max}/8) * 4 + D * 2$ | $4 + (R_{max}/8) * 4 + D * 3$ |
| $(R_{max}/8) * 5$ | 4 | $4 + R_{max}/8$ | $4 + (R_{max}/8) * 2$ | $4 + (R_{max}/8) * 3$ | $4 + (R_{max}/8) * 3 + D$ | $4 + (R_{max}/8) * 3 + D * 2$ | $4 + (R_{max}/8) * 3 + D * 3$ | $4 + (R_{max}/8) * 3 + D * 4$ |
| $(R_{max}/8) * 6$ | 4 | $4 + R_{max}/8$ | $4 + (R_{max}/8) * 2$ | $4 + (R_{max}/8) * 2 + D$ | $4 + (R_{max}/8) * 2 + D * 2$ | $4 + (R_{max}/8) * 2 + D * 3$ | $4 + (R_{max}/8) * 2 + D * 4$ | $4 + (R_{max}/8) * 2 + D * 5$ |
| $(R_{max}/8) * 7$ | 4 | $4 + R_{max}/8$ | $4 + (R_{max}/8) + D$ | $4 + (R_{max}/8) + D * 2$ | $4 + (R_{max}/8) + D * 3$ | $4 + (R_{max}/8) + D * 4$ | $4 + R_{max}/8 + D * 5$ | $4 + R_{max}/8 + D * 6$ |
| $(R_{max}/8) * 8$ | 4 | $4 + D$ | $4 + D * 2$ | $4 + D * 3$ | $4 + D * 4$ | $4 + D * 5$ | $4 + D * 6$ | $4 + D * 7.$ |

6. A base station for transmitting a downlink channel, comprising:
a radio frequency (RF) unit; and
a processor configured to control the RF unit,
wherein the processor is configured to
control the RF unit to transmit a physical downlink control channel (PDCCH) carrying downlink control information (DCI) in a PDCCH search space R times, wherein R is a positive integer; and
control the RF unit to transmit a physical downlink shared channel (PDSCH) starting from subframe l after subframe n, in which the PDCCH is transmitted last, based on the DCI,
wherein the DCI includes information indicating the subframe l among possible PDSCH start positions,
wherein the possible PDSCH start positions are determined based on a ratio of a maximum number of PDCCH repetitions $R_{max}$ in the PDCCH search space and are determined based on a ratio of the number of times D related to repetition of the PDSCH after the PDCCH search space,
wherein the information indicating the subframe l in the DCI indicates the number m of subframes from the subframe n to the subframe l,
wherein the subframe n is subframe $k_0+k$, the subframe $k_0+k$ being a k-th subframe from start subframe $k_0$ of the PDCCH search space,
wherein k is a multiple of $(R_{max}/8)$, and
wherein m is given by the following table:

| | m | 0 | 1 | 2 | 3 | 4 | 5 | 6 | 7 |
|---|---|---|---|---|---|---|---|---|---|
| k | $R_{max}/8$ | 4 | $4 + R_{max}/8$ | $4 + (R_{max}/8) * 2$ | $4 + (R_{max}/8) * 3$ | $4 + (R_{max}/8) * 4$ | $4 + (R_{max}/8) * 5$ | $4 + (R_{max}/8) * 6$ | $4 + (R_{max}/8) * 7$ |
| | $(R_{max}/8) * 2$ | 4 | $4 + R_{max}/8$ | $4 + (R_{max}/8) * 2$ | $4 + (R_{max}/8) * 3$ | $4 + (R_{max}/8) * 4$ | $4 + (R_{max}/8) * 5$ | $4 + (R_{max}/8) * 6$ | $4 + (R_{max}/8) * 6 + D$ |
| | $(R_{max}/8) * 3$ | 4 | $4 + R_{max}/8$ | $4 + (R_{max}/8) * 2$ | $4 + (R_{max}/8) * 3$ | $4 + (R_{max}/8) * 4$ | $4 + (R_{max}/8) * 5$ | $4 + (R_{max}/8) * 5 + D$ | $4 + (R_{max}/8) * 5 + D * 2$ |
| | $(R_{max}/8) * 4$ | 4 | $4 + R_{max}/8$ | $4 + (R_{max}/8) * 2$ | $4 + (R_{max}/8) * 3$ | $4 + (R_{max}/8) * 4$ | $4 + (R_{max}/8) * 4 + D$ | $4 + (R_{max}/8) * 4 + D * 2$ | $4 + (R_{max}/8) * 4 + D * 3$ |
| | $(R_{max}/8) * 5$ | 4 | $4 + R_{max}/8$ | $4 + (R_{max}/8) * 2$ | $4 + (R_{max}/8) * 3$ | $4 + (R_{max}/8) * 3 + D$ | $4 + (R_{max}/8) * 3 + D * 2$ | $4 + (R_{max}/8) * 3 + D * 3$ | $4 + (R_{max}/8) * 3 + D * 4$ |
| | $(R_{max}/8) * 6$ | 4 | $4 + R_{max}/8$ | $4 + (R_{max}/8) * 2$ | $4 + (R_{max}/8) * 2 + D$ | $4 + (R_{max}/8) * 2 + D * 2$ | $4 + (R_{max}/8) * 2 + D * 3$ | $4 + (R_{max}/8) * 2 + D * 4$ | $4 + (R_{max}/8) * 2 + D * 5$ |
| | $(R_{max}/8) * 7$ | 4 | $4 + R_{max}/8$ | $4 + (R_{max}/8) + D$ | $4 + (R_{max}/8) + D * 2$ | $4 + (R_{max}/8) + D * 3$ | $4 + (R_{max}/8) + D * 4$ | $4 + R_{max}/8 + D * 5$ | $4 + R_{max}/8 + D * 6$ |
| | $(R_{max}/8) * 8$ | 4 | $4 + D$ | $4 + D * 2$ | $4 + D * 3$ | $4 + D * 4$ | $4 + D * 5$ | $4 + D * 6$ | $4 + D * 7.$ |

* * * * *